United States Patent [19]

Economou

[11] Patent Number: 5,239,879
[45] Date of Patent: Aug. 31, 1993

[54] SIMPLE STEPLESS VARIABLES TRANSMISSION

[76] Inventor: Demitri G. Economou, 1275 Ulupii St., Kailua, Hi. 96734

[21] Appl. No.: 689,250
[22] PCT Filed: May 24, 1991
[86] PCT No.: PCT/US91/03679
§ 371 Date: May 24, 1991
§ 102(e) Date: May 24, 1991
[51] Int. Cl.⁵ .................... F16H 21/14; F16H 29/04
[52] U.S. Cl. ............................................. 74/69; 74/117
[58] Field of Search ...................... 74/69, 117, 125.5

[56] References Cited

U.S. PATENT DOCUMENTS

| | | | |
|---|---|---|---|
| 634,327 | 10/1899 | Dieterich | 74/117 X |
| 1,257,479 | 2/1918 | Grant | 74/121 |
| 2,067,513 | 1/1937 | Talbot | 74/69 X |
| 2,178,784 | 11/1939 | Ewart | 74/125.5 X |
| 2,254,195 | 8/1941 | Cicin | 74/119 |
| 2,286,694 | 6/1942 | Talbot | 74/69 |
| 2,364,393 | 12/1944 | Seeck | 74/69 |
| 2,547,453 | 4/1951 | Egy | 74/117 X |
| 2,691,896 | 10/1954 | Stageberg | 74/119 |
| 3,448,627 | 6/1969 | Brooks | 74/117 |
| 3,623,376 | 11/1971 | Call | 74/125.5 |
| 3,805,628 | 4/1974 | Hulin | 74/69 |
| 3,881,362 | 5/1975 | Beezer | 74/53 |
| 3,924,478 | 12/1975 | Takasu | 74/63 |
| 4,075,896 | 2/1978 | Pessina et al. | 74/69 |
| 4,112,778 | 9/1978 | Korosue | 74/117 |
| 4,411,172 | 10/1983 | DeMarco | 74/690 |
| 4,493,222 | 1/1985 | Heine | 74/216.3 |
| 4,765,195 | 8/1988 | Takami | 74/113 |
| 5,113,712 | 5/1992 | Economou | 74/69 |

FOREIGN PATENT DOCUMENTS

| | | |
|---|---|---|
| 1750894 | 3/1970 | Fed. Rep. of Germany . |
| 1929633 | 12/1970 | Fed. Rep. of Germany . |
| 523895 | 4/1955 | Italy .......................... 74/69 |
| 595370 | 12/1947 | United Kingdom . |
| 772770 | 3/1955 | United Kingdom . |

Primary Examiner—Allan D. Herrmann
Assistant Examiner—David W. Laub
Attorney, Agent, or Firm—Martin E. Hsia

[57] ABSTRACT

A simple stepless variable transmission in which rotation of an input shaft (10) is translated into circular motion of an input stage arm (16) which is then converted into periodic rotation of an intermediate linkage (20) around a center of rotation that is displaced from the center of circular motion of the input stage arm (16). The periodic rotation of the intermediate linkage (20) drives an output stage arm (30) into periodic circular motion about a center that is displaced from the center of rotation of the intermediate linkage (20). An overrunning clutch (36) then transmits the useful portion of the periodic circular motion to an output shaft (37). Simultaneously controllably varying the distances between the centers of motion for the input stage arm (16), the intermediate linkage (20) and the output stage arm (30) controllably varies the ratio of the transmission.

21 Claims, 15 Drawing Sheets

PERIODIC MOTION PRIOR ART INTERMEDIATE MODULES

MOTION OF MULTIPLE MODULES, PHASE SHIFTED

MOTION AT OUTPUT SHAFT

SIMPLE STEPLESS VARIABLES TRANSMISSION

DESCRIPTION

TECHNICAL FIELD

This invention relates to a simple stepless variable transmission.

There has been a long felt but unmet need for an efficient, durable and mechanically simple stepless variable transmission, as evidenced by the number of prior inventions related to the subject. Many machines, based on a variety of principles, have been proposed or built in an effort to achieve these goals, yet to date there has not been a truly successful simple stepless variable transmission.

BACKGROUND ART

U.S. Pat. No. 3,623,376 to Call discloses a stepless variable transmission comprising an input shaft, an output shaft, a plurality of modules and overrunning clutches which transforms the rotation of an input shaft into offset sinusoidal components which are selectively recombined by the overrunning clutches to achieve a constant speed output which can be varied.

U.S. Pat. No. 2,286,694 to Talbot discloses a variable speed drive having a module with an input shaft, an input stage arm, an input arm engagement member, an intermediate stage linkage, an output stage arm, an output engagement member and control means.

U.S. Pat. No. 1,257,479 to Grant discloses a transmission mechanical providing for multiple partial rotations of a tubular shaft and disks that can be moved from concentric to eccentric positions. The disks also have yokes, cams and racks.

U.S. Pat. No. 2,254,195 to Cicin discloses a stepless mechanical torque converter that converts rotations into turning motions, linear reciprocating movements, rotating oscillations and into uniform rotation.

U.S. Pat. No. 2,691,896 to Stageberg discloses a variable speed power transmission using a crank mechanism that includes a plurality of connecting rods and ratchet mechanisms.

U.S. Pat. No. 3,448,627 to Brooks discloses a gearless variable drive mechanism utilizing a rotating disk with an eccentric groove, a plurality of one way clutches and circumferentially spaced members engaging each of the clutches and the eccentric groove, each of the clutches having cam surfaces.

U.S. Pat. No. 3,881,362 to Beezer discloses a device for transmitting controlled movements in both an X axis and a Y axis direction including a rotatable shaft with separate drive cams for separately driving levers connected through slides to a first member which is guided for movement in an X direction and also connected through a cam drive and an adjustable slide to a second member which is mounted for movement along the Y axis.

U.S. Pat. No. 3,924,478 to Takasu discloses a speed reduction mechanism utilizing an eccentric with a driving disk mounted freely for rotation on the eccentric.

U.S. Pat. No. 4,112,778 to Korosue discloses a variable speed power transmission provided with rotary units that are mounted on an input axis and an output axis and parallel with each other with a phase angle difference between the rotary units, each of the rotary units having eccentric cams and a clutch.

U.S. Pat. No. 4,411,172 to DeMarco discloses a variable speed reducing and torque transmitting mechanism including a pair of counter rotating low speed impellers being driven from a spider shaft rotating at relatively high speed.

U.S. Pat. No. 4,493,222 to Heine discloses a gearless speed and torque converter using an input member mounted on a rotatable input shaft that has an Archimedes spiral groove bearing surface with an adjacently exposed output member with a complementary Archimedes spiral groove bearing surface where the grooves have different pitches. The shafts are coaxially mounted and a plurality of balls are disposed between the respective spiral grooves.

U.S. Pat. No. 4,765,195 to Takami discloses a stepless transmission mechanism using intermeshing noncircular gears and multiple shafts.

Traction machines have shown some success in light duty applications but have failed in heavy duty service. Torque converters have been used in more demanding situations but with considerable loss of efficiency. Purely mechanical, modified motion mechanisms have suffered either from complexity of design or from lack of smooth motion at the output shaft, resulting in limited and specialized applications.

The basic approach to purely mechanical, stepless transmissions utilizing cams, linkages, noncircular gears and other members is, first, to use an input to drive a plurality of intermediate stages through cycles phased appropriately with the input. A selector mechanism then extracts and recombines the desired portion of the driven cycle of each of the parallel intermediate stages to drive the output shaft, usually through one way (overrunning) clutches and/or differentials (Takami, Brooks, Korosue, Stageberg). Other types of more complicated coupling through timed gear engagement can be found (Grant), as well as yet more complicated arrangements with conversion of rotary motion to linear and back to rotary (Cicin).

A key characteristic of prior stepless variable transmissions is the required plurality of parallel intermediate modules. Each parallel module creates a full cycle of a periodic motion for each revolution of the input shaft, subsequently transferring a portion of that motion to the output shaft (FIG. 8). The general shortcoming of these devices is that, at the transition point, when the driving force switches from one module to the next, there is an abrupt change in the magnitude and direction of the velocity and/or accelerating force reflected on the output shaft. In most cases (Brooks, Korosue, Stageberg) there also exists a large difference between the maximum and minimum velocity of each module during the power portion of the cycle (FIG. 5), which is transmitted to the output shaft. The end result is that the output shaft motion is the summation of a series of impulses, usually smoothed out only by drive line inertia. The final result is that the impulses produce shock loads requiring oversize components even in light duty applications. There are instances where force and velocity discontinuities are not carried in the power portion of the mechanism (Takami's angular velocity modulation mechanism). Nevertheless, there is shock loading in the transition of the drive components from one exponential ratio to another, a weakness inherent in the design if the number of parallel intermediate stages is to be minimized.

DISCLOSURE OF INVENTION

This invention comprises a device including a minimum of two modules, each module having three stages: an input stage, an intermediate stage and an output stage.

The input stages of each module can all be mounted on a single input stage subframe, the intermediate stages of each module can all be mounted on a single intermediate stage subframe and the output stages of each module can all be mounted on a single output stage subframe. The intermediate and the output modules are connected to a control mechanism that preferably regulates their positions with respect to the input module and thus effects speed variation.

The input stage translates rotation of an input shaft into circular motion of an input stage arm. The output stage translates circular motion of an output stage arm into rotation of an output shaft through a one way overrunning clutch. The clutch is necessary because (preferably) two complementary modules that are (preferably) 180° out of phase are used. The clutch transfers the rotation of the faster (driving) module at that time to the output and allows the slower module at that time to complete its rotation until it becomes the faster (driving) module. Thus, the input and output stages are complementary and mechanically very simple.

The intermediate stage couples the input stage arm to the output stage arm through a rotating slotted intermediate disk. The input stage arm and the output stage arm are engaged in the slot in the intermediate disk. The center of rotation of the intermediate stage slotted disk is displaced from the centers of circular motion of the input stage arm and the output stage arm.

The intermediate disk is rotatably driven into a periodic motion, that, depending on the control settings, may become either full circle rotation or oscillation. Both types of motion are hereinafter referred to as "periodic rotation" or "periodic rotational motion." Motion of the input stage arm along the slot is not transmitted. In complementary fashion, the output stage arm is driven into a periodic circular motion by the periodic rotation of the intermediate disk; motion of the output stage arm along the slot is not transmitted.

The distance between the center of the input shaft and the center of the intermediate disk (the input-intermediate center distance) and the distance between the center of the intermediate disk and the center of the output shaft (the intermediate-output center distance) then are set so that the desired periodic circular motion of the output stage shaft is obtained, namely nearly constant velocity through at least 180° of rotation of the input shaft (see FIG. 9). This setting of the two distances is easily accomplished by displacing the intermediate stage subframe in relation to the input stage subframe (to change the input-intermediate center distance) and by displacing the output stage subframe in relation to the intermediate stage subframe (to change the intermediate-output center distance). Of course, the input stage subframe also could be displaced in relation to the intermediate stage subframe. The key is simultaneously controlling both the input-intermediate center distance and the intermediate-output center distance.

The output stage shafts from a plurality of modules then are combined to drive the output shaft. This is easily accomplished in a two module device by simply coupling each of the output stage shafts to output stage gears through one way (overrunning) clutches, mounting an output gear on the output shaft and having both output stage gears drive the output gear (the clutches allow the faster module to drive the output shaft while the slower module completes its return cycle). Belts or other means can be used as well.

As can be seen from the above, this invention translates the circular motion of the input stage arm into a periodic rotation of the intermediate stage disk because the center of the circular motion of the input stage arm is displaced from the center of rotation of the intermediate stage disk by the input-intermediate center distance. That periodic rotation is then corrected by being translated into periodic circular motion of the output stage arm about a center of circular motion that is displaced from the center of rotation of the intermediate stage disk by the intermediate-output center distance. This flattens the portion of the velocity curve that is transferred to the output (FIG. 9) if the input-intermediate center distance and the intermediate-output center distance are appropriately set.

As a result, even a minimum configuration of two parallel modules (each transmitting power over 180° of the input cycle) can produce motion with no discontinuities and with amplitude variations much smaller than comparable four module arrangements encountered in prior art devices (Brooks, Korosue, Stageberg), without the mechanical complications of multiple sets of stepped noncircular gears (Takami).

Changing the drive ratios between the input and output shafts is accomplished by simultaneously controlling two parameters: the input-intermediate center distance and the intermediate-output center distance. The changes in the input-intermediate center distance and the intermediate-output center distance are dependent on each other because the device would not function properly or efficiently if the two distances are varied independently. It is anticipated that the changes in the input-intermediate center distance will be substantially linearly related to the changes in the intermediate-output center distance. However, if extreme accuracy is required, some departure from linearity may be required. Preferably, this constrained interdependent control of the two distances is accomplished by coupling the two distances to a single screw having two sections on its shaft, each section having a different pitch. The dual control accomplishes not only the average speed regulation that prior art devices accomplish, it also extends control over the instantaneous ratio, which provides the means for smooth motions and eliminates shock loads.

In a special case of the invention, the lengths of the input and output arms can be selected so that the necessary change in the input-intermediate center distance to change the transmission ratio is exactly offset by an equal and opposite change in the intermediate-output center distance so that controlling only one parameter effectively controls both.

BRIEF DESCRIPTION OF THE DRAWINGS

FIG. 9(a) shows periodic rotational motion of the intermediate disk. FIG. 9(b) shows periodic circular motion of one output stage arm. FIG. 9(c) shows the addition of the periodic circular motion of two output stage arms. FIG. 9(d) shows motion of the output shaft.

BEST MODE FOR CARRYING OUT THE INVENTION

A. The General Case.

Referring to FIGS. 1 to 7, an input shaft 10, supported by bearings 11 is rigidly connected to an input gear 12, which drives an identical set of gears 13A and 13B, supported by input stage shafts 14A and 14B respectively. Input stage shafts 14A and 14B are supported by input stage shaft bearings 15A and 15B and are rigidly connected to input stage driver arms 16A and 16B. The input stage driver arms 16A and 16B engage slotted intermediate disks 20A and 20B, respectively, through input stage engagement members, preferably antifriction rollers 17A and 17B. The intermediate disks 20A and 20B are rotatably supported in the movable intermediate subframe 21 through the intermediate disk bearing assemblies 22A and 22B.

Figure 7:
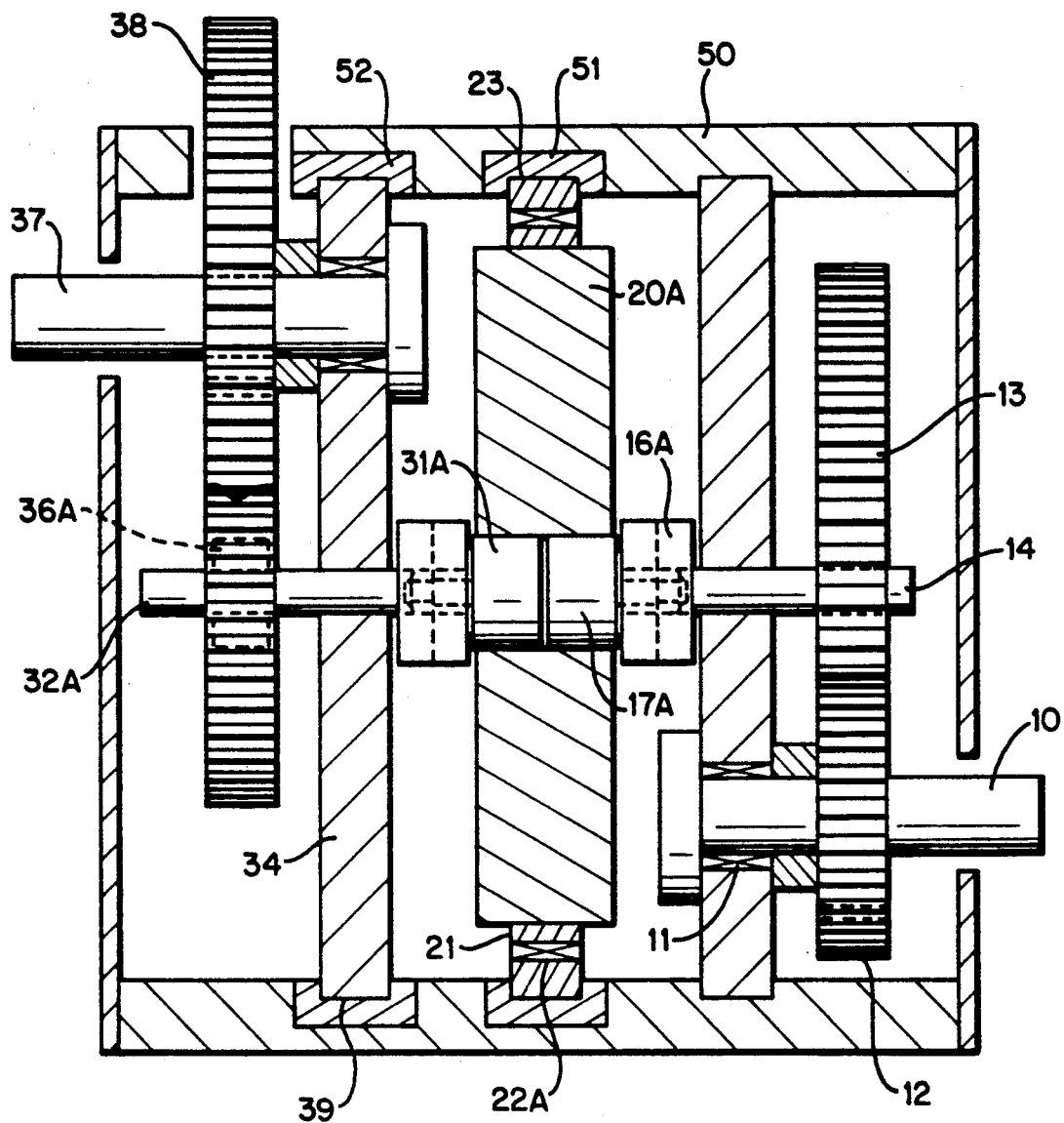
FIG. 7 is an elevational view along the line 7—7 of FIG. 6.
Figure 8A:
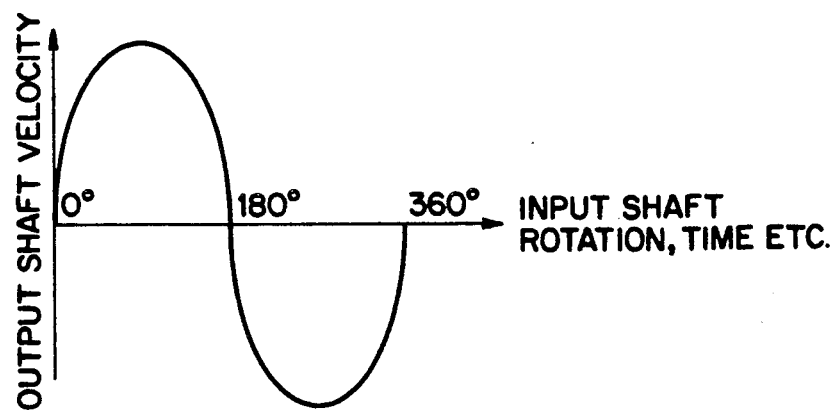
FIGS. 8(a), 8(b) and 8(c) are graphical representations of typical output modes of prior stepless variable transmissions.
Figure 8B:
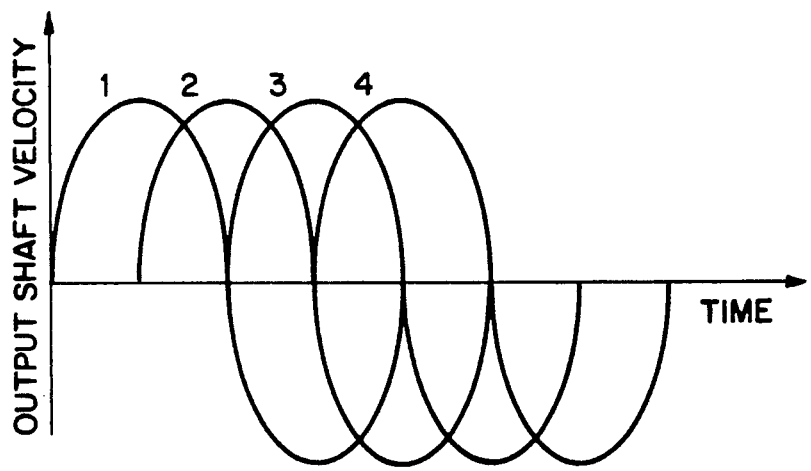
Figure 8C:
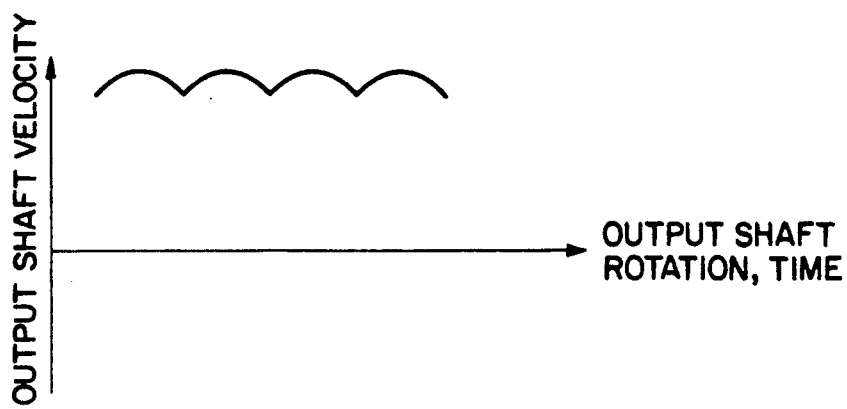
Figure 9A:
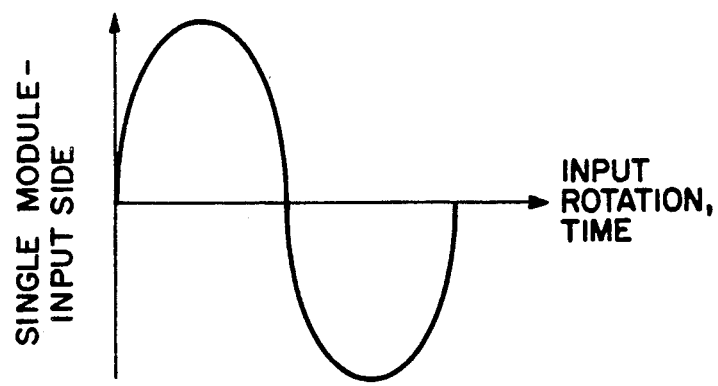
FIGS. 9(a), 9(b), 9(c) and 9(d) are graphical representations of the motions of a stepless variable transmission according to this invention.
Figure 9B:
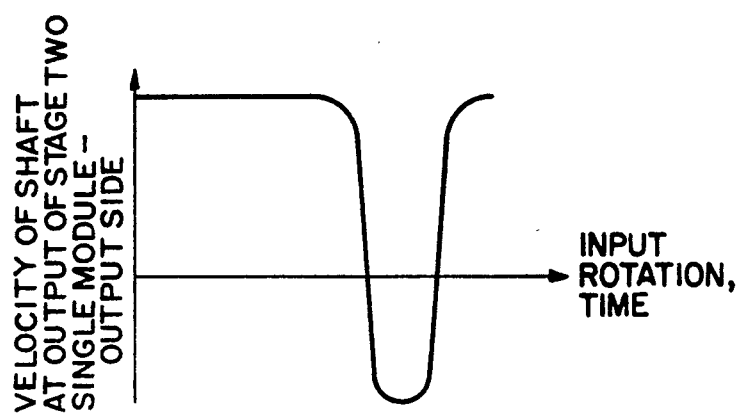
Figure 9C:
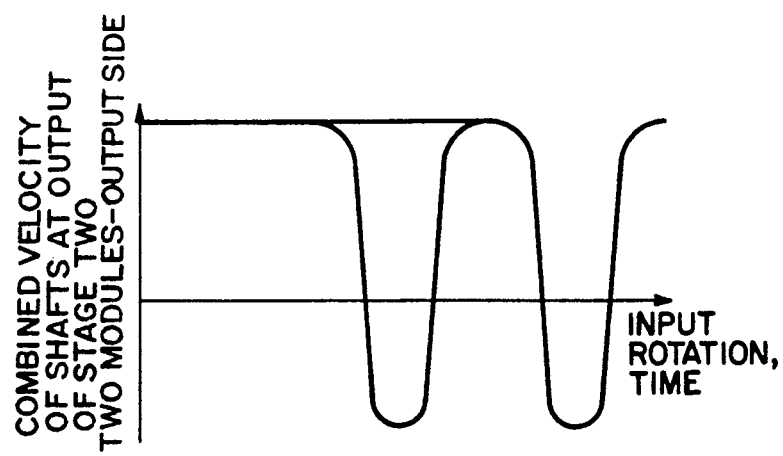
Figure 9D:
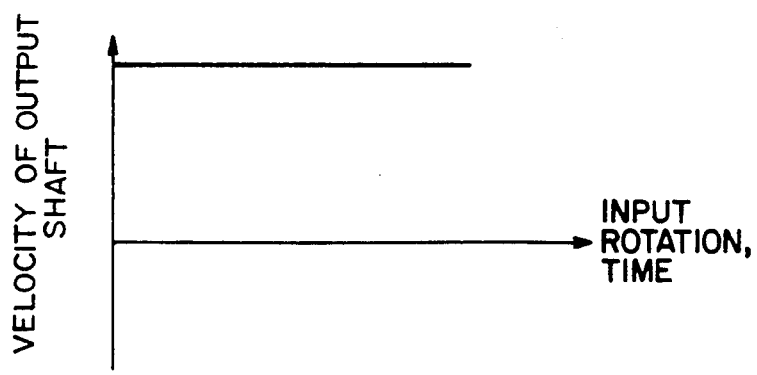

Referring to FIG. 7, the intermediate subframe has slots 23 which engage the main frame 50 through rails 51.

The intermediate disks 20A and 20B engage output stage arms 30A and 30B through output stage antifriction rollers 31A and 31B. The output stage arms 30A and 30B are rigidly connected to output stage engagement members, preferably shafts 32A and 32B, which are supported by output stage shaft bearings 33A and 33B, mounted on output subframe 34.

The output stage shafts 32A and 32B drive output stage gears 35A and 35B through one way output stage roller clutches 36A and 36B. The output stage gears 35A and 35B are coupled to output shaft 37 through output gear 38.

The output shaft 37 is supported by output shaft bearings 33C, mounted in the movable output stage subframe 34, having output stage slots 39 which engage the fixed rails 52 of the main frame 50 (see FIG. 7).

A control screw 40 with two different pitches 41 and 42 controls the position of the intermediate subframe 21 and output stage subframe 34 through screw blocks 43 and 44, which are rigidly attached to the output subframe 34 and the intermediate subframe 21. The control screw 40 is supported by bearings 45 and 46, which are mounted on the main frame 50. The springs 47 and 48 push on the subframes and the threads 41 and 42 to minimize backlash. The control screw 40 is controlled by hand crank 49.

Figure 17A:
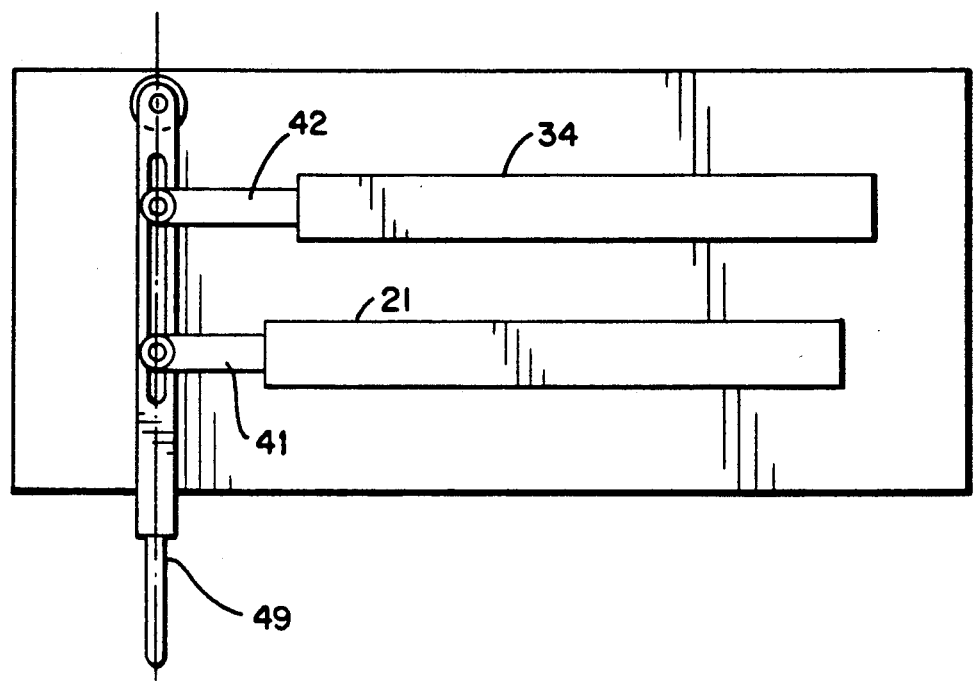
FIG. 17(a) is a top plan view of an embodiment showing control of the position of two modules using a straight linkage that is pivoted at one end.
Figure 17B:
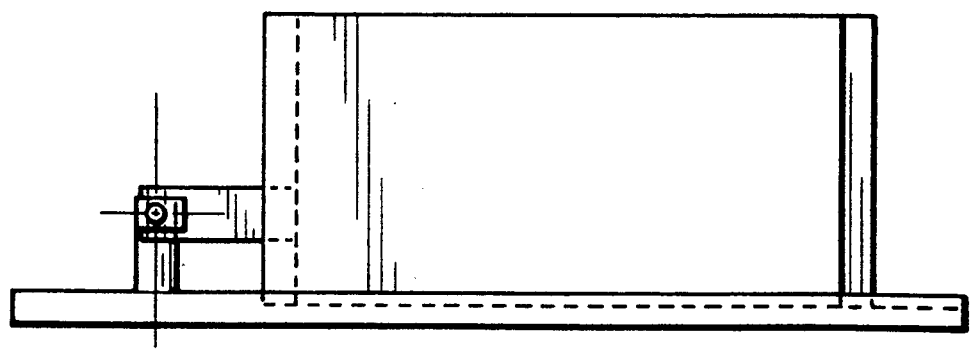
FIG. 17(b) is an elevational view of the embodiment of FIG. 17(a).

Referring to FIGS. 17(a) and 17(b), instead of a hand crank, control can be effected by using a straight linkage 49 that is pivoted at one end, with the subframes being pivotably attached along the length of the linkage 49. Preferably the subframes are attached to a slot along the linkage 49 to allow some movement along the linkage 49 as the linkage 49 itself is pivoted so that the subframes will not be forced to move transversely.

Components identified with a numeral and a suffix A or B are associated with intermediate modules A and B respectively. The components are identical; the only difference is that the driver arms 16A and 16B are phased 180° apart on the input shaft 10. From this point on the suffix will be dropped and the assumption will be made that reference is made to the module through which power is transmitted at the time.

Input stage driver arm 16, input stage roller 17 and the intermediate disk 20 comprise a slider linkage that produces a periodic rotation on the intermediate stage generally shown in FIG. 9. The intermediate disk 20, output stage roller 31 and output stage arm 30 also comprise a slider linkage, complementary to the first, which performs the conversion of the motion of intermediate disk 20 into the smooth output at the output shaft 37. The introduction of the second slider linkage, when properly coupled to the continuously varying rotation of the intermediate disk 20 (through proper selection of the input-intermediate center distance and the intermediate-output center distance), reduces the error of output velocity fluctuations to very low levels. Prior art devices would require a large number of parallel modules to approach the linearity of the present invention, with the shock problem in the transition from one stage to the other still unsolved (Brooks, Stageberg), or they would require complicated mechanisms using modulation of different motion curves (Takami, exponential velocity addition, Cicin, $\sin^2$ and $\cos^2$ analysis and recombination).

MATHEMATICAL PRINCIPLES THAT THE INVENTOR BELIEVES GOVERN THIS INVENTION

For the convenience of the reader, a mathematical description of the invention now follows, but this is only a description of how the inventor presently believes the invention works, and not a definitive explanation. Accordingly, even if the description and explanation are erroneous, the validity and enforceability of this patent shall not be affected. Further, no limitations are to be implied or inferred from the description or explanation.

Figure 10:
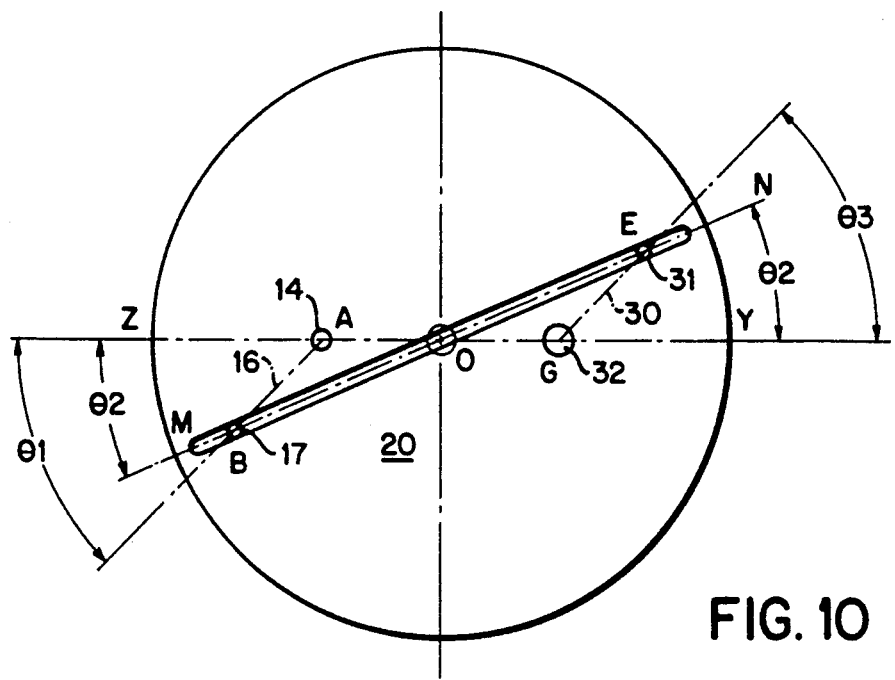
FIG. 10 is a diagram showing the geometry of this invention.
Figure 2:
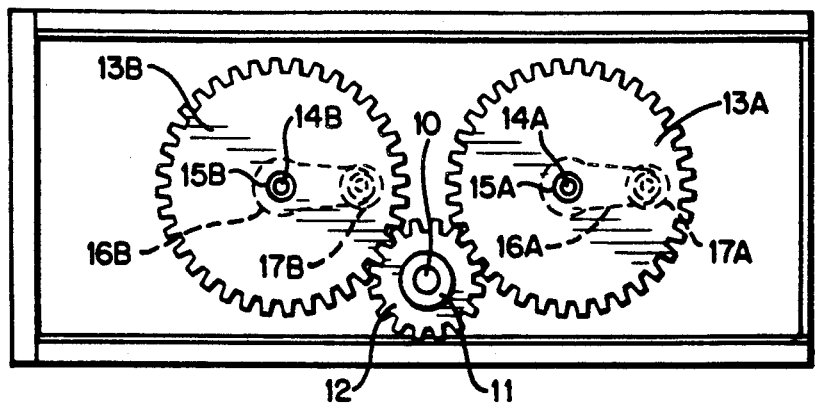
FIG. 2 is an elevational view of the input module of a preferred embodiment of a stepless variable transmission in accordance with this invention, utilizing two parallel modules.
Figure 3:
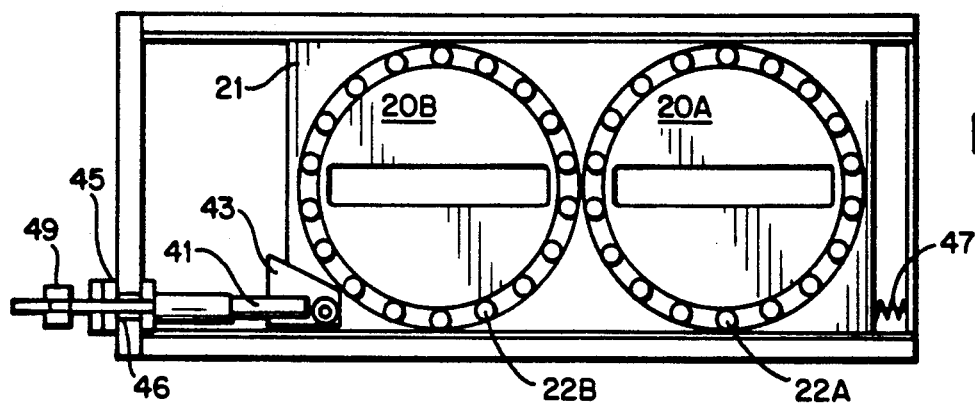
FIG. 3 is an elevational view of the intermediate module of a preferred embodiment of a stepless variable transmission in accordance with this invention.
Figure 4:
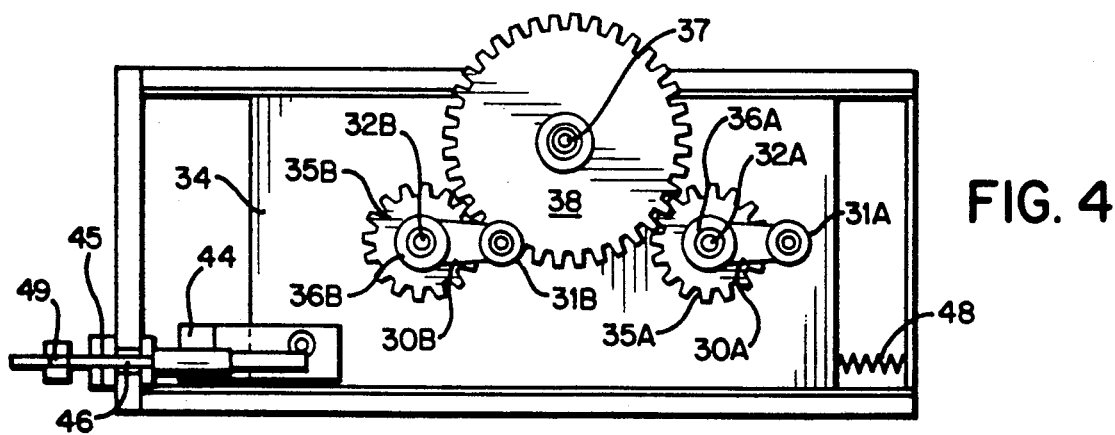
FIG. 4 is an elevational view of the output module of a preferred embodiment of a stepless variable transmission in accordance with this invention.
Figure 5:
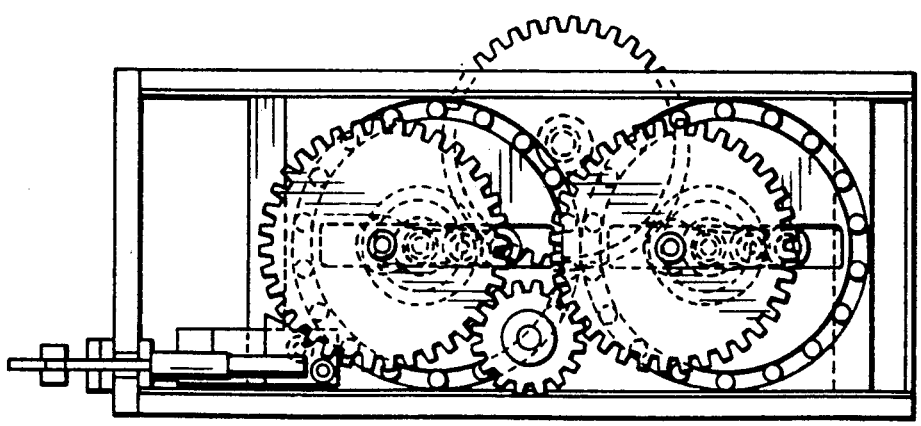
FIG. 5 is an elevational view of the complete assembly of the modules of FIGS. 2, 3 and 4.
Figure 6:
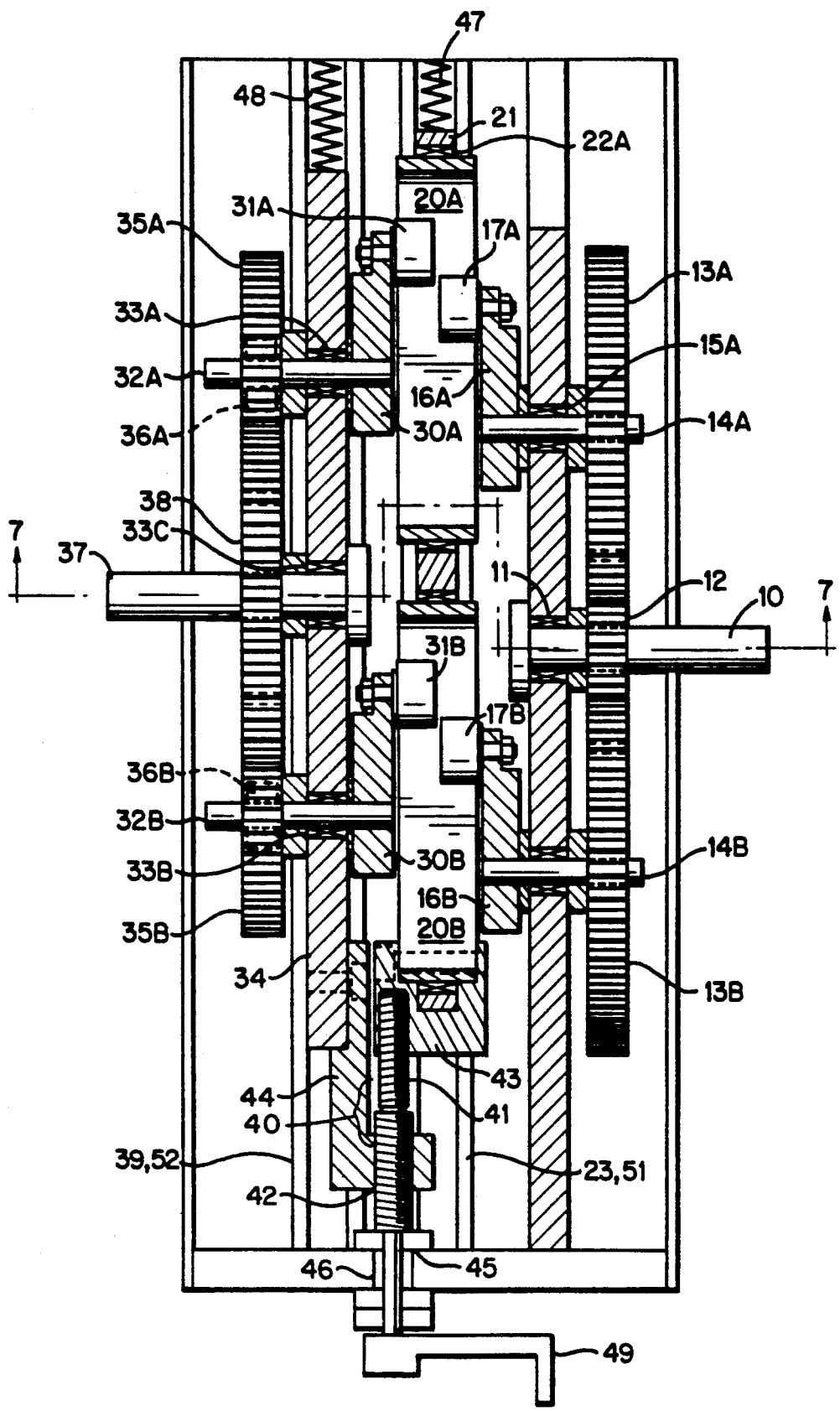
FIG. 6 is a sectional plan view of the complete assembly of FIG. 5.

The basic geometry of FIG. 1 to 7 is extracted and redrawn on FIG. 10. The center of input stage shaft 14 is at point A, the input stage driver arm 16 extends from A to B, the center of intermediate disk 20 is at 0, the centerline of the slot on disk 20 is indicated by the line MN, the centerline of the output stage shaft 32 is at G, the output stage arm 30 is EG. The input-intermediate center distance is AO and the intermediate-output center distance is GO. It should be noted though that any pair of the group AO, AB, OG, EG can be used. The three centers G, 0, A are colinear along the axis YZ. For simplicity, consider first the starting position with the slot MN horizontal, which in turn forces the driver and driven arms in horizontal alignment (not shown). When the input shaft turns through an angle $\theta_1$, a corresponding rotation $\theta_2$ is produced on the intermediate disk, indicated by the rotated slot centerline MN. The mathematical relationship between $\theta_1$ and $\theta_2$ is given by equ. 10:

$$\theta_2 = \arctan[(AB^*\sin(\theta_1))/(AB^*\cos(\theta_1) + AO)] \quad (10)$$

The rotation $\theta_2$ of the intermediate disk results in a rotation $\theta_3$ of the driven arm EG. The magnitude of $\theta_3$ can be determined in two steps as shown by equations 20 and 30:

$$EO = OF + FE = OG^*\cos(\theta_2) + [(EG^2 - (GO^*\sin(\theta_2)^2))]^{\frac{1}{2}} \quad (20)$$

$$\theta_3 = \arctan[(ED)/(OD - OG)] = = \arctan[(EO^*\sin(\theta_2))/(EO^*\cos(\theta_2) - OG)] \quad (30)$$

Since the value of $\theta_3$ is obtained the ratio $\theta_3/\theta_1$ can be compared to the theoretical ratio given by equ. 40:

$$R = (EG + OG)/(AB + AO) \quad (40)$$

The deviation of $\theta_3$ from the ideal value that would correspond with equ. 40 results in an error which can be found from equ. 50:

$$E = R - \theta_3/\theta_1 \quad (50)$$

Figure 11:
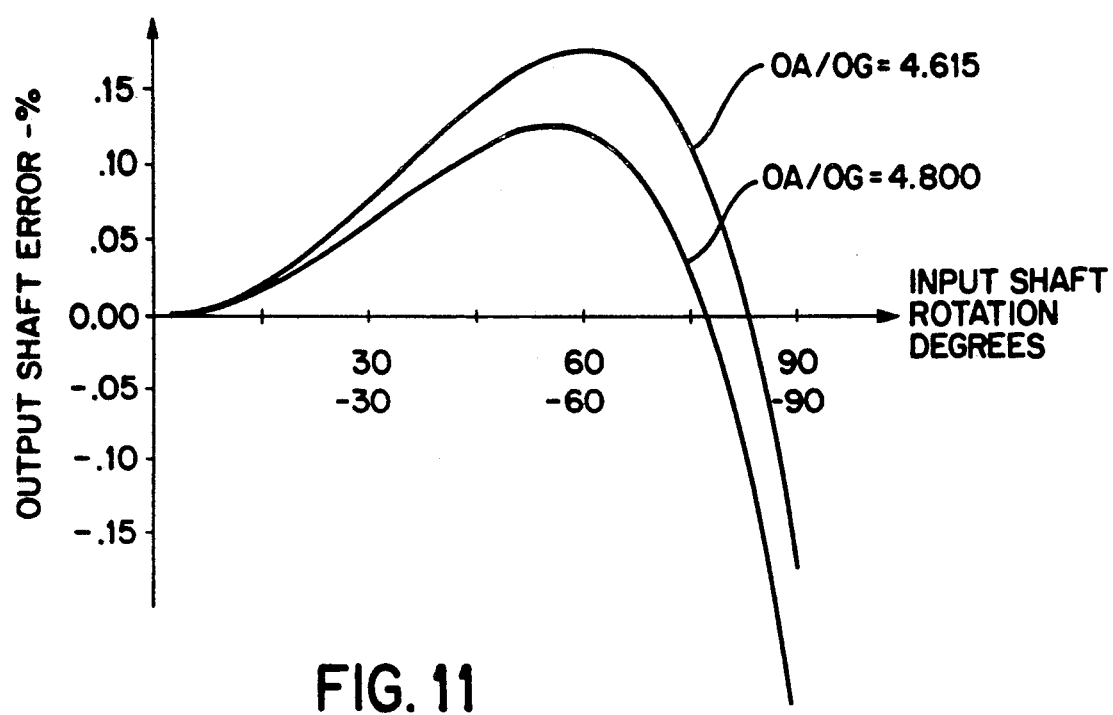
FIG. 11 is a graph showing expected control curve tuning.
Figure 12:
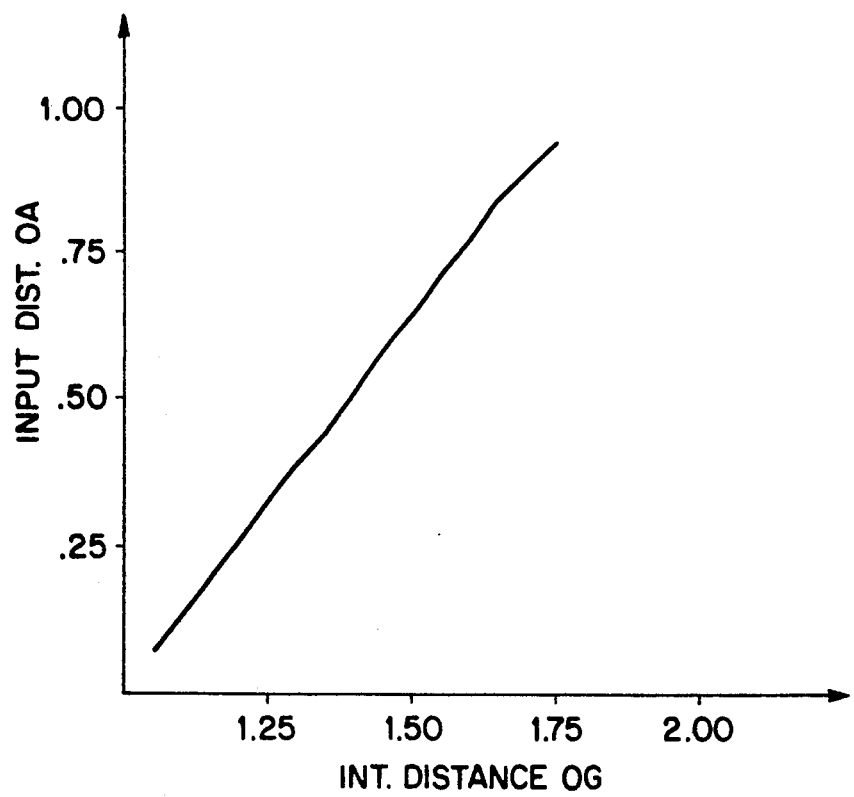
FIG. 12 is a graph showing an expected control curve.
Figure 14A:
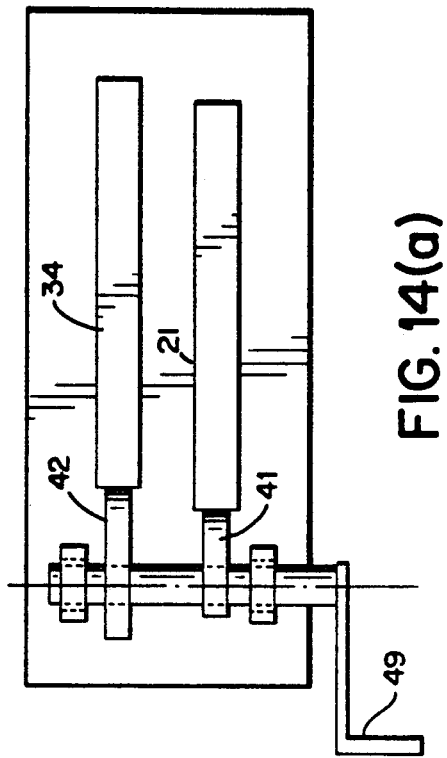
FIG. 14(a) is a top plan view of a control system using cams.
Figure 14B:
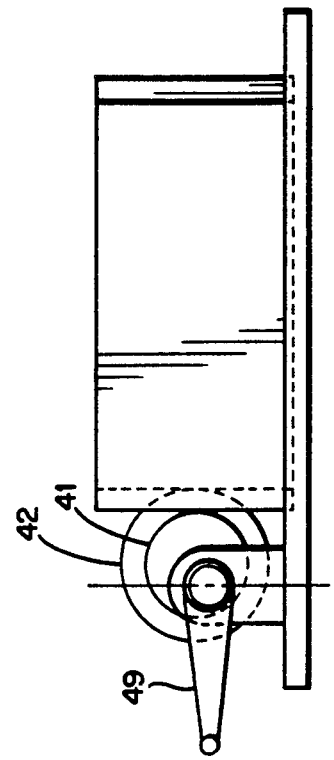
FIG. 14(b) is an elevational view of the control system of FIG. 14(a).

The basic achievement of this invention is accomplished through minimizing the magnitude of the error in 50, accomplished through optimization of the control parameters OG and OA. Mathematically this can be accomplished by differentiating the error function with respect to the desired variable; in order to avoid the very lengthy equations that substitution of 10, 20, 30 and 40 in 50 would produce, an iterative process is used instead, better suited for the capabilities of state of the art computers. The results of the inventor's iterative calculation are shown in FIG. 11 and FIG. 12, with FIG. 11 showing a typical error variation for two different settings of the second center distances, and FIG. 12 showing the total results, showing an optimum relationship between the two control parameters OA and OG. Qualitatively the error is minimized by selecting AO and OG in such a manner that the nonlinearity encountered in obtaining $\theta_2$ from $\theta_1$ is offset by the nonlinearity developed in producing $\theta_3$ from $\theta_2$. The error cancellation is usually possible when the intermediate angle $\theta_2$ has a value between $\theta_1$ and $\theta_3$; that is true because then one of the ratios $\theta_3/\theta_2$ and $\theta_2/\theta_1$ would be less than unity, while the other would be greater unity, and, as $\theta_1$ increases toward the 90 degree mark, the ratio that is greater than 1 tends to decrease while the ratio that is less than 1 tends to increase, resulting in a more or less constant product.

The process of using a second stage translation of motion essentially to invert the first stage translation of motion differentiates this invention from devices similar to Brooks, Korosue etc. and provides much smoother performance. The process is also clearly different from the process in devices that utilize a fixed speed variation curve and subtract its value at phase shifted points to obtain constant output (Takami). The working mechanical elements are by far simpler than any noncircular gear or cam arrangement and far fewer than impulse type devices, thus achieving the goal of simple and durable components.

It is theoretically possible to adjust the error as close to zero as would be desired. Such accuracy would require continuous adjustment of some of the controlling parameters through each rotation of the input shaft and would result in mechanically complicated structures. The simpler approach has been taken for the preferred embodiment of this invention, which, for each ratio, maintains a fixed relationship between the center distances OA and OG, independent from input shaft rotation angle. Adjustment is easily obtainable with a single shaft 40 driving two different pitch screws 42 and 43, controlling the position of the movable subframes 21 and 34, which in turn dictate the magnitude of OA and OG. The accuracy of the simpler control is satisfactory for most but the most demanding applications. Should greater accuracy be required, addition of a third (or even fourth) parallel module in the subframes 21 and 34 can achieve the desired result, reducing the operating cycle to 120° of rotation for each, resulting in maximum error of the order of 0.02%, without changing the control method B. The Special Case As indicated above, the invention is based on control of two interdependent variables or parameters, namely an input-intermediate center distance (distance AO in figure 10, and 53 in FIG. 18) and an output-intermediate center distance (distance OG in FIG. 10, and 52 in FIG. 18). The relationship between these two parameters necessary to produce a linearly varying relationship between input and output can be approximated by a straight line, as shown by FIG. 12. Thus, in order to change the input speed/output speed ratio (the transmission ratio), the change in the first control parameter is approximately linearly proportional to the change in the second control parameter. The proportionality constant is the slope of the straight line approximation.

Figure 18:
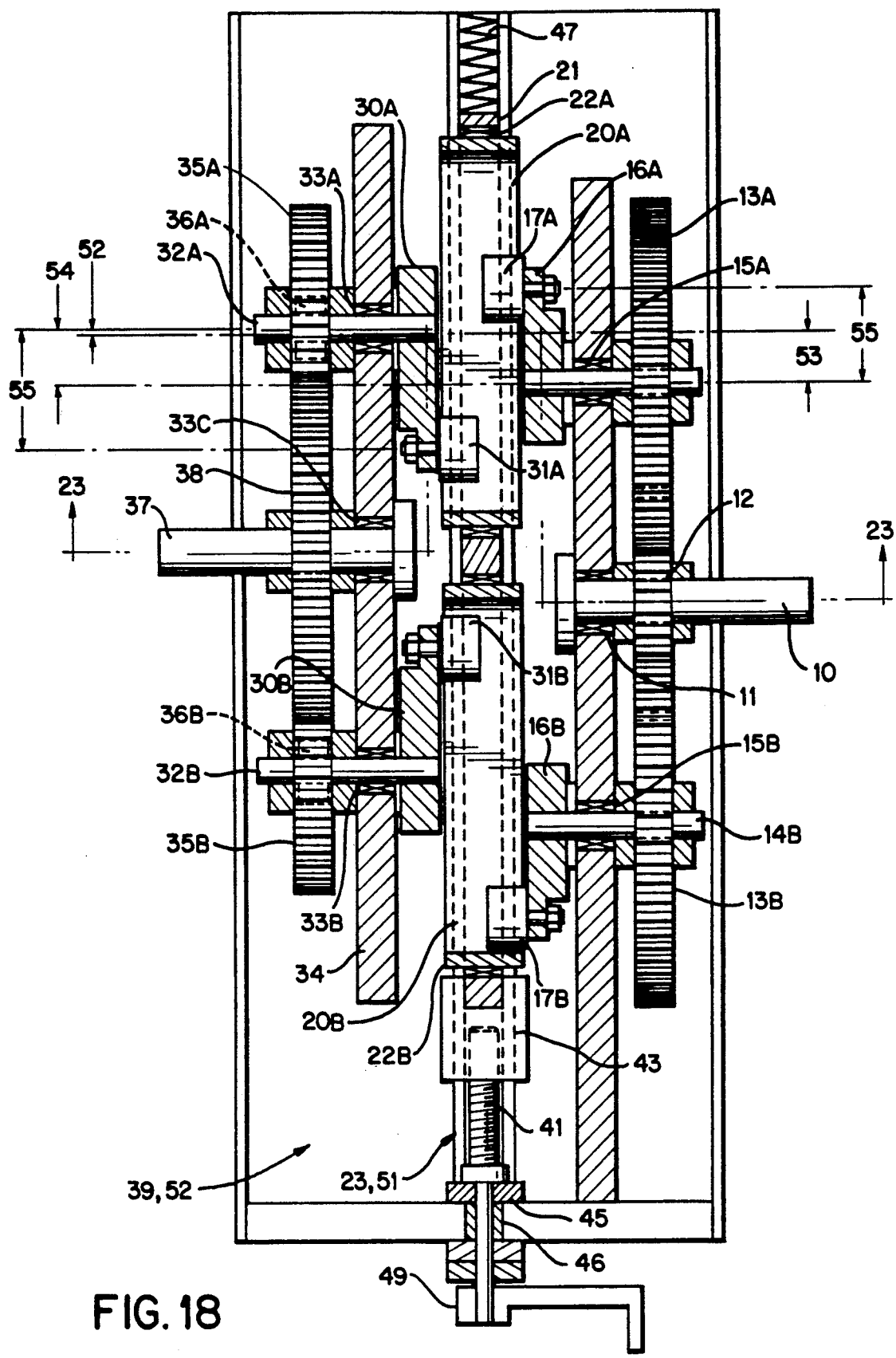
FIG. 18 is a top plan view of an embodiment in which the two controlled parameters vary equally in magnitude but in opposite directions so that both parameters can be controlled by a single mechanism, a single pitch screw being illustrated.
Figure 19:
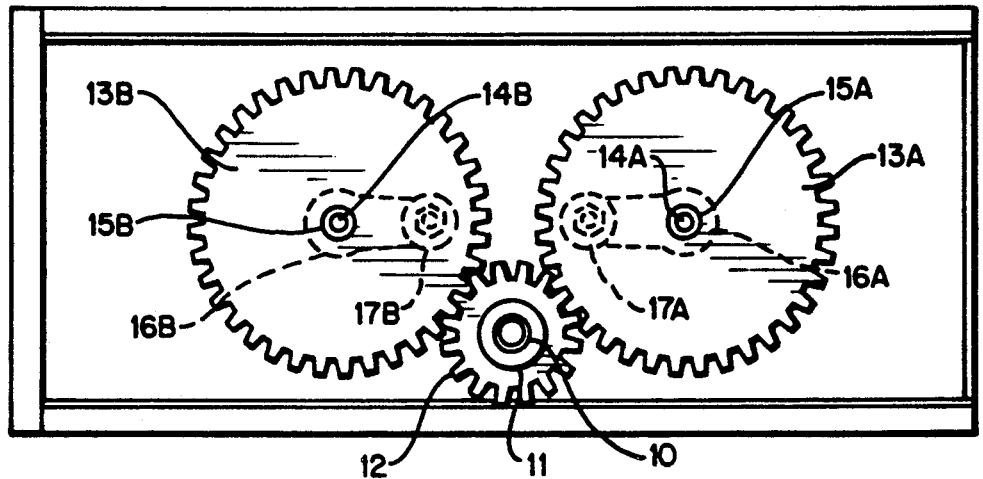
FIG. 19 is a side elevational view of the input module of the embodiment of FIG. 18.
Figure 20:
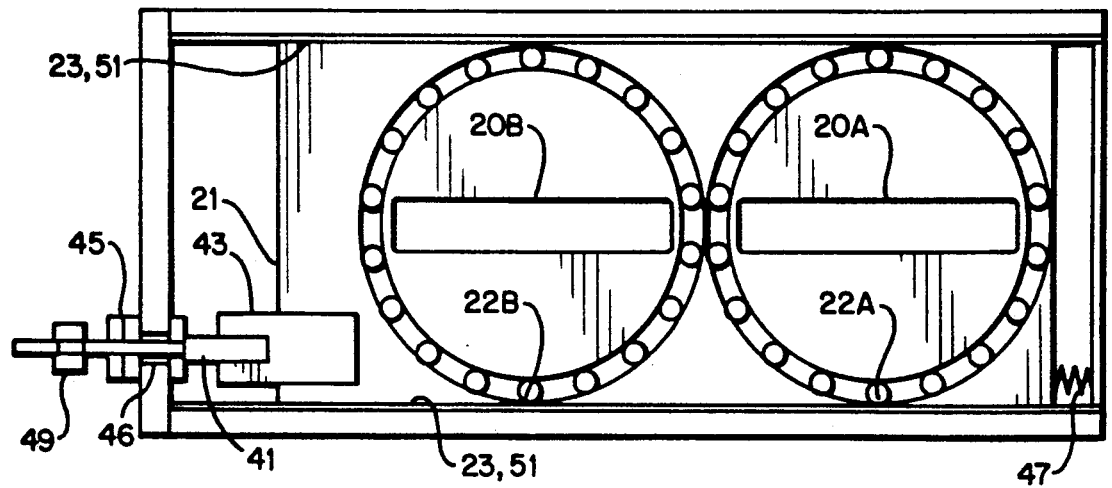
FIG. 20 is an elevational view of the intermediate module of the embodiment of FIG. 18.
Figure 21:
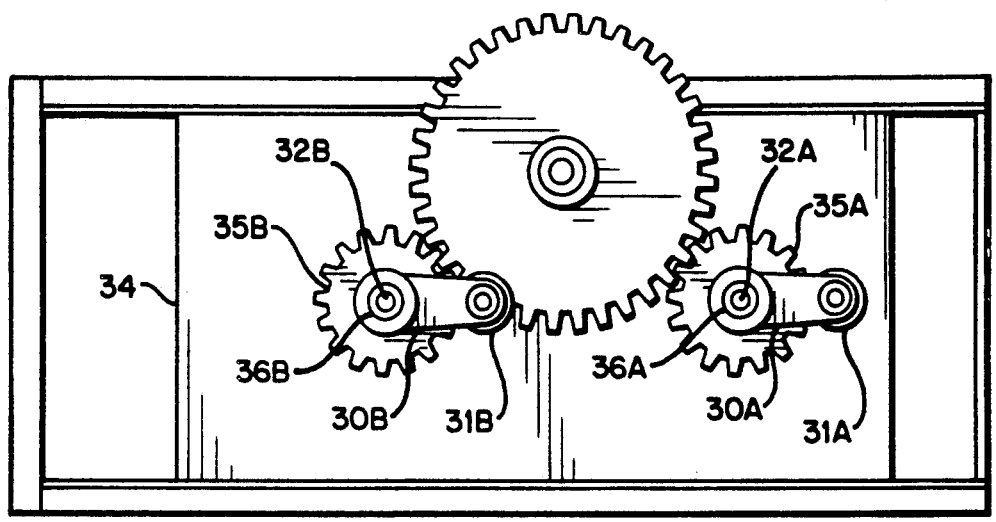
FIG. 21 is an elevational view of the output module of the embodiment of FIG. 18.
Figure 22:
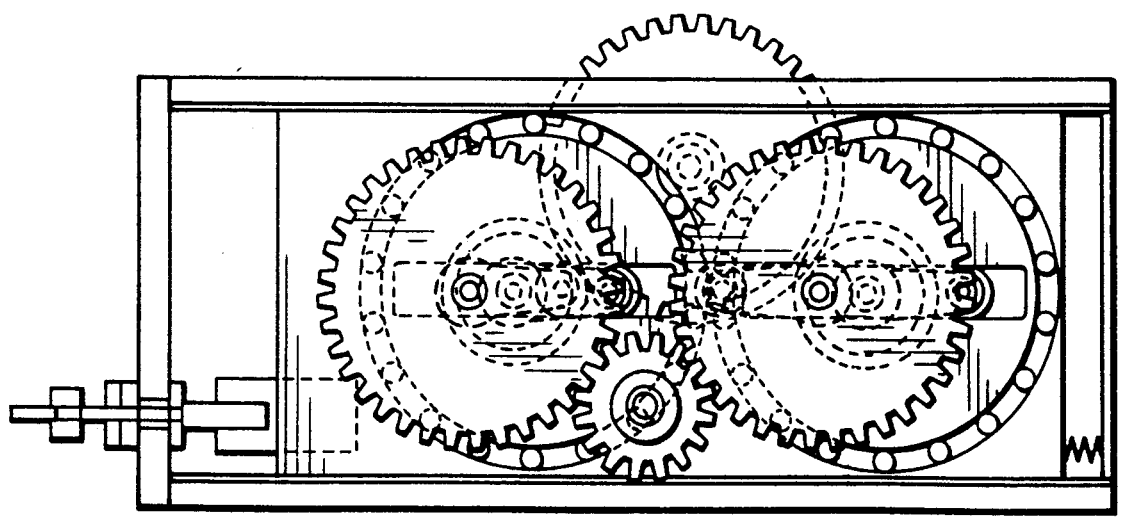
FIG. 22 is an elevational view of the complete assembly of the. modules of FIGS. 19, 20 and 21.
Figure 23:
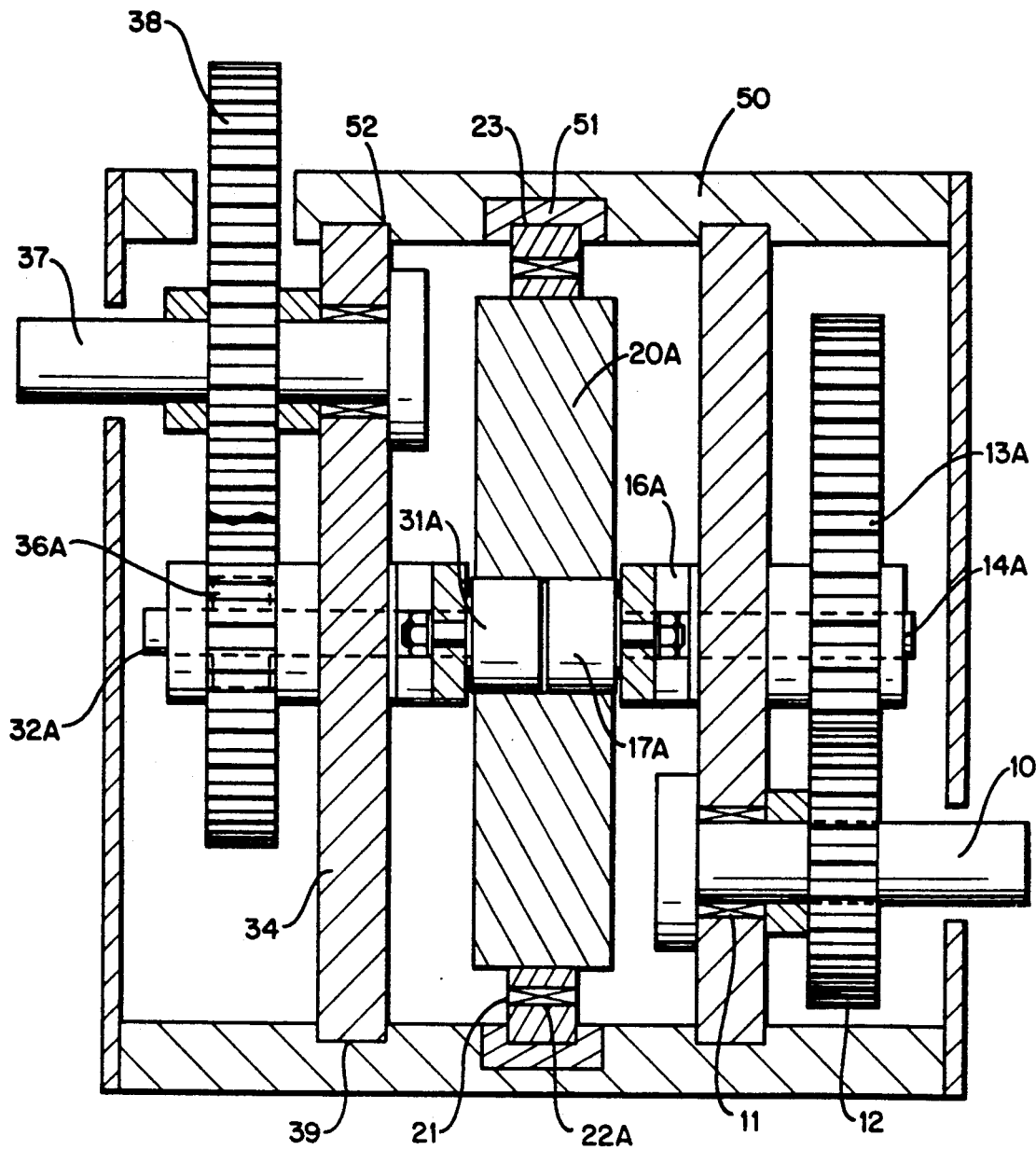
FIG. 23 is a front elevational view of the complete assembly of FIG. 22.

A special case of the invention can be made when the relationship between the two variables is not only linear, but also equal in magnitude and opposite in direction, as shown in FIG. 18.

Referring to FIG. 18 and the elevations shown in FIGS. 19, 20, 21, 22 and 23, an input shaft 10, mounted in bearings 11, turns a gear 12 which drives gears 13a and 13b, mounted on shafts 14a and 14b, rotating on bearings 15a and 15b. Each shaft drives an input arm 16a and 16b, which in turn translates a rotation on the slotted intermediate modules 20a and 20b through camrolls 17a and 17b. The intermediate modules are mounted on bearings 22a and 22b, which in turn are housed in the movable intermediate housing 21. The housing is mounted through and slides on rails 23, which are part of the fixed housing 51. Each intermediate module drives one of the output arms 30a and 30b through camrolls 31a and 31b. The output arms turn output shafts 32a and 32b, mounted on bearings 33a and 33b. The shafts drive output gears 35a and 35b through one way clutches 36a and 36b. Gears 35a and 35b are transmitting torque from input to output for half of the time. (Other embodiments with three or four parallel modules would also have corresponding input and intermediate components c and d, respectively, and each output gear would transmit torque for ⅓ and ¼ of the time, respectively, and so on). Each output gear is mounted so that it engages final output gear 38, which drives the output shaft 37, mounted on bearings 33c. Speed control is accomplished by turning crank 49, supported by bearings 45 and 46 and driving screw 41, which in turn engages screw block 43, rigidly attached to the intermediate module 21. A compression spring 47 is also shown as part of the control mechanism as it is used to preload the screw against the nut threads, to prevent vibration and unwanted speed variation through backlash. As the crank turns and the screw 41 moves the intermediate block 21 along rails 23, the input-intermediate center distance 53 is changed by the same magnitude as the intermediate-output center distance 52. The basic difference from the general case is that the length 56 of the input arms 16a and 16b is not equal to the length 55 of arms 30a and 30b, but is scaled so that the required second pitch of the control screw of FIG. 5 becomes equal to the first pitch, thus eliminating the need for a second pitch and independently moving a second subframe. Two parameters are still controlled, but geometric relations between the arms are exploited to control these two parameters by moving only one housing.

Figure 24:
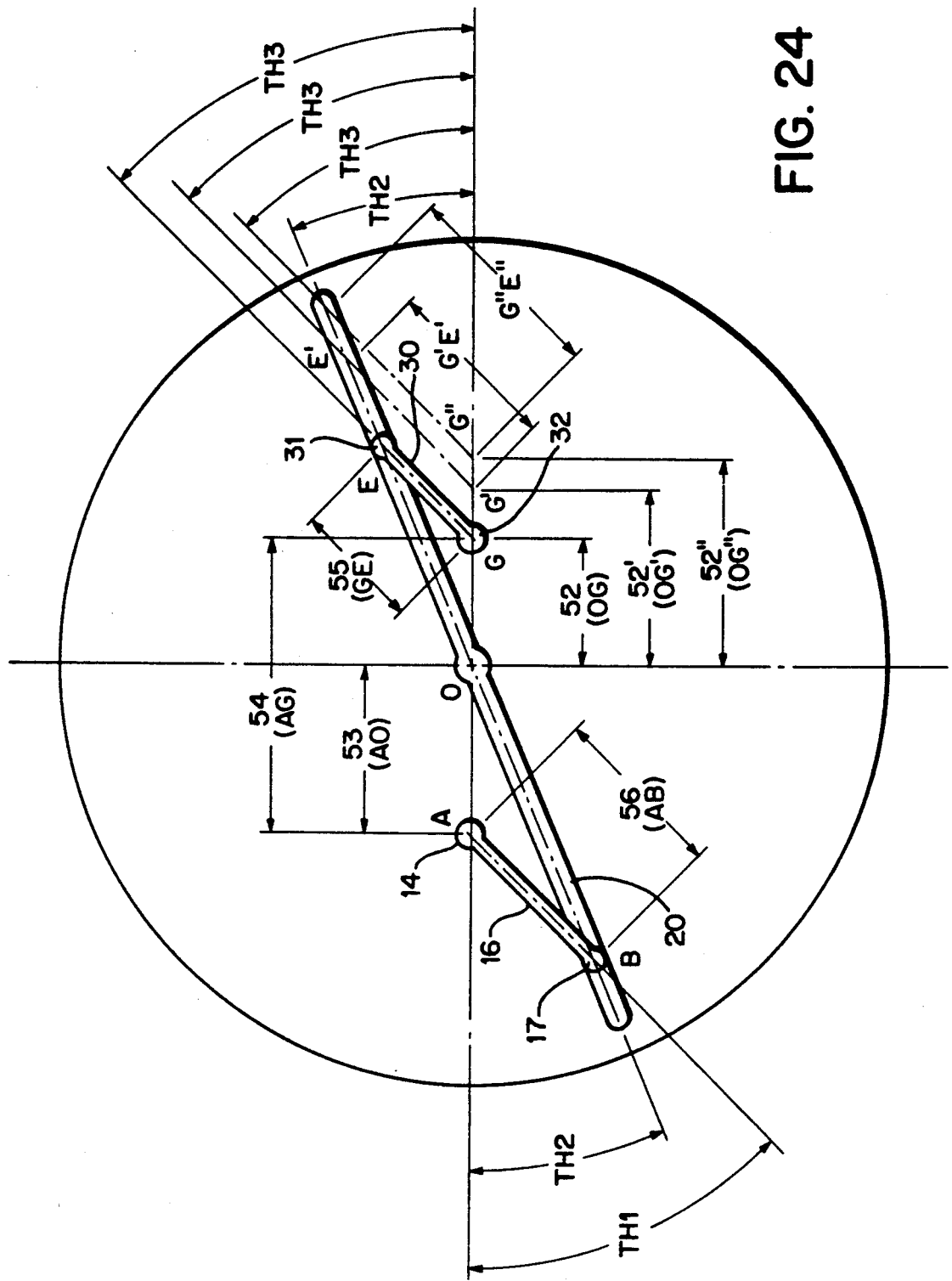
FIG. 24 is a diagram showing the geometry of the embodiment o FIG. 18.

The scaling of one of the arms is geometrically illustrated in FIG. 24, where the input arm 16 (subscripts a and b are hereinafter omitted for clarity), having magnitude AB, rotates through an angle TH1, translates a rotation TH2 on the intermediate arm 20, which in turn translates the desired output shaft rotation TH3 through any one of three output arms 30, having different magnitudes GE, G,E, and G"E", at respective center distances OG, OG, and OG,, The number of "correct" arms (producing the desired result) is infinite, as there are infinitely many triangles similar to triangle OGE. Only two such similar triangles, OG'E' and OG"E" are illustrated for clarity, and they clearly show that for each selected input radius AB, located at a distance OA from an intermediate center 0 there is a distinct family of distances OG (each with its own output radius GO) that geometrically produce a desired rotation TH3 from an input rotation TH1. The special case is obtained by selecting one specific intermediate-output center distance OG (through proper selection of the corresponding radius GE), which changes equally with the input-intermediate center distance OA as the ratio is changed, thus allowing the overall distance AG (FIG. 24, also shown as 54 in FIG. 18), to remain constant.

Such a geometric arrangement would simplify the invention greatly, as control of both parameters can be accomplished by moving only the intermediate module subframe while maintaining the input-output center distance AG (which is the sum of the input-intermediate center distance AO and the intermediate-output center distance OG) constant. This means that the input shaft 14 and output shaft 32 can remain fixed. When the input-intermediate center distance is changed to effect a different ratio on the output shaft, the change that corresponds to the proper intermediate-output center distance is precisely equal and opposite to the change in the input-intermediate distance, achieved automatically by the movement of the intermediate subframe.

As stated above, the complicated relationship between the interdependent variables can be approximated by a linear relationship, provided that the number of parallel modules and the range of variation are also taken into consideration. The basic equations 10 through 50 still apply. However, as also stated above, solving the basic equations would be extremely lengthy. Accordingly, an iterative process suited for use on computers is used instead.

In order to determine some specific arm radii ratios, different combinations of input-intermediate center distance AO and intermediate-output center distance OG are considered, while setting the input and output arm radii AB and GE are both set equal to 1. Once an optimum value OG, producing minimal error for a given transmission ratio range is found, the output arm radius GE and the intermediate-output center distance OG are scaled so that the change in input-intermediate center distance OA necessary to change the transmission ratio the desired amount is equal and opposite to the necessary change in intermediate-output center distance OG. Thus, if with equal input and output arm radii it was found that the input-intermediate distance changes by one inch and the intermediate-output center distance changes by ¾ as the transmission ratio is varied from minimum to maximum, both the output arm radius and the intermediate-output center distance are multiplied by $[1/(0.75) = 1.33333]$, to yield a net change of 1 inch for the intermediate-output center distance, exactly equal to the input-intermediate change.

Figure 13:
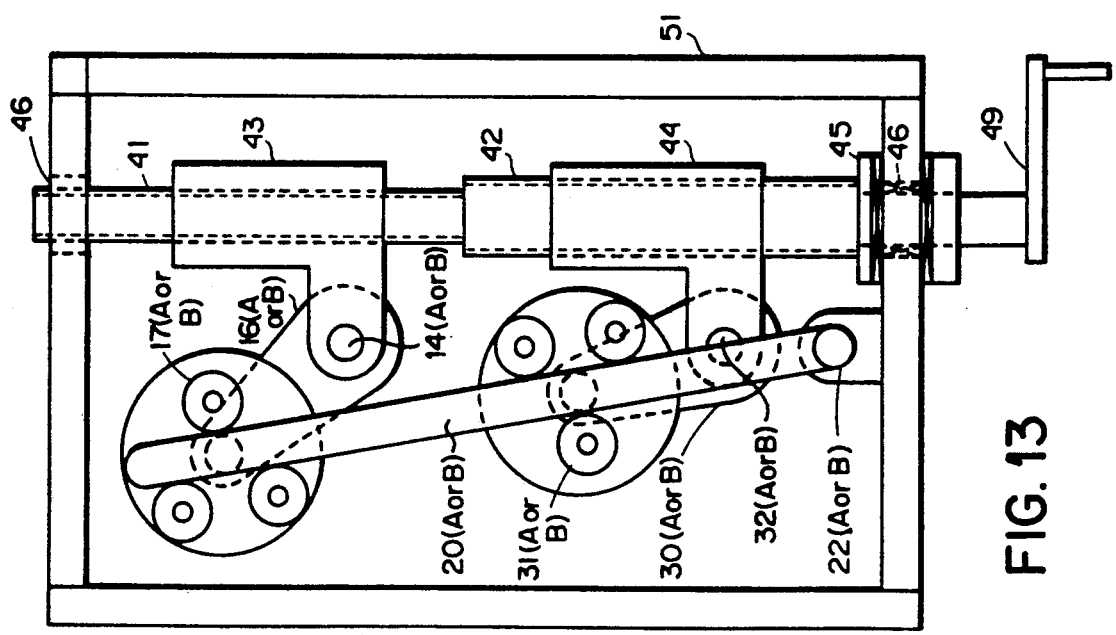
FIG. 13 is a diagram illustrating a conceptual oscillating stepless variable transmission.

This scaling accomplishes the task of selecting the correct position for the center of the output module and the corresponding intermediate-output distance OG. The following table discloses some specific examples of such relations, including approximate ratios between the input arm radius and the arm radius, as well as fixed center distances which determine the correct initial settings. The table was developed using a spreadsheet computer program as follows: the equations of the geometric relations were solved for different combinations of center distances. The combinations with the least error were slightly modified, to produce straight line relations between different transmission ratios (for example, so that a change of 0.1 in the input-intermediate distance always corresponds to a change of 0.77 in the intermediate-output center distance). Finally, the straight line relation between input and output center distances was changed to 1:1 by multiplying one of the parameters with the constant from the previous step:

Depending on the relationship between the drive arm radius AB and the magnitude of the input-intermediate center distance OA, the intermediate disk will undergo either a full rotation or oscillation. The inherent range of ratios for the case of oscillation ranges from zero to 0.5:1. A different preferred embodiment possessing such capabilities is shown in FIG. 13, utilizing the added feature of zero output velocity to provide clutchless engagement and disengagement.

The case of complete intermediate disk rotation can also be implemented in a variety of ways, some of which will be briefly discussed below. Typically the variations are also applicable in the oscillating disk domain.

Figure 1:
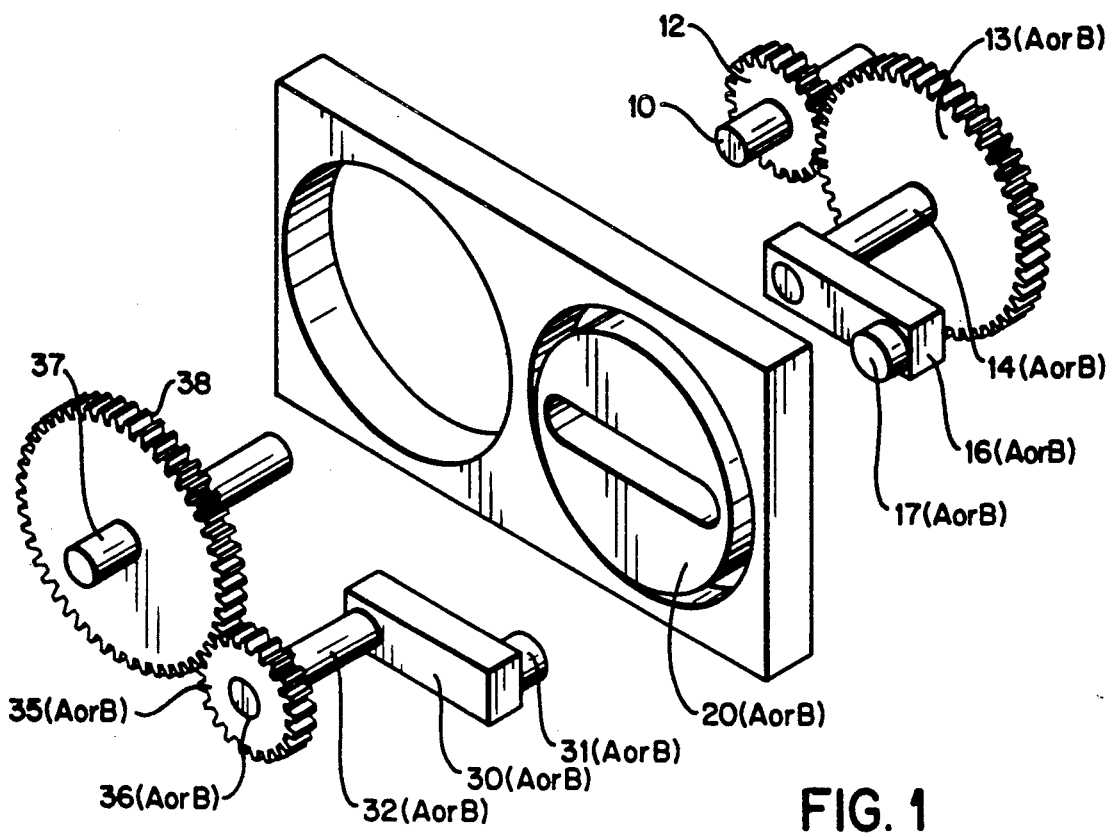
FIG. 1 is an exploded view of the driving arrangement for a single 180° module of a preferred embodiment of a stepless variable transmission in accordance with this invention, the arrangement for the complementary 180° module and the subframes for the input and output modules being omitted for clarity.

The two modules can be placed in an inline arrangement, with one parallel module relocated to one side of the other module, in an assembly more compact than FIG. 1.

The rollers 17 and 31 can be replaced with sliding bearings. Similarly, the slider linkage can be replaced

TABLE OF TYPICAL CENTER DISTANCES AND RATIOS AS ILLUSTRATED IN FIG. 24

| # MODULES IN PARALLEL | RATIO OF ARM RADII GE/AB | CENTER DIST. FIXED, AG INPUT-OUTPUT | CENTER DIST. OA @ RATIO GIVEN - REF | RATIO RANGE THEORETICAL |
|---|---|---|---|---|
| 2 | 1.210 | 1.299 | 0.5878 @ 1:1 | 1:1–1.66:1 |
| 3 | 1.192 | 1.213 | 0.5536 @ 1:1 | 1:1–1.88:1 |
| 4 | 1.075 | 1.088 | 0.5246 @ 1:1 | 1:1–1.87:1 |
| 2 | 0.770 | 1.000 | 1.000 @ .5:1 | .5:1 TO ZERO |
| 3 | 0.893 | 1.000 | 1.000 @ .5:1 | .5:1 TO ZERO |
| 4 | 0.935 | 1.000 | 1.000 @ .5:1 | .5:1 TO ZERO |

These numbers are approximate and can be fine tuned within smaller ranges of ratios if accuracy is more important than range. The value of the input-intermediate arm radius is taken as 1.

INDUSTRIAL APPLICABILITY

This invention achieves stepless rotational speed variation between an input shaft and an output shaft with high mechanical efficiency and a minimum of intermediate modules. This invention produces smooth motion at the output shaft, eliminating step changes in velocity, thereby eliminating shock loads on the transmission components. This invention also uses a very small number of easily fabricated parts and therefore is capable of competing commercially with existing multiple fixed ratio speed variators. This invention achieves stepless speed variation of high accuracy with minimum added mechanical complexity, including the use of simple means for controlling the steplessly variable mechanism, capable of easily interfacing with existing automatic control schemes.

The invention has been described above with respect to particular preferred embodiments. However, it will be appreciated by those skilled in the art that many modifications and variations can be made without departing from the spirit and scope of the invention. Without limitation to the foregoing, the terms circular motion and rotational motion shall be deemed to mean and include oscillating circular motion and oscillating rotational motion. Further, a device could use changes in the input-intermediate center distance for one control parameter and changes in the radius of the output stage arm for another control parameter, and vice versa The term "arm" also shall be deemed to mean any member that provides a moment arm for action of circular or rotational motion, including a disk, gears or the like.

with a roller linkage.

The speed adjustment mechanism can be replaced with a different mechanical assembly utilizing multiple screws, multiple screw types, linkages, circular and/or plate cams, servomotors, electromechanical controls in general air/oil systems, hydraulic actuators, etc, achieving relative motions of two stages similar to FIG. 9. Cam mechanisms can be used instead of the screw threads 41 and 42, which more easily allows deviations from a strictly linear relationship between OG and OA, further improving the accuracy.

Servos and/or fixed and/or adjustable cams etc., can be used for dynamic adjustment of OA and OG, achieving high precision out of few parallel modules. As can be seen from FIG. 11, there are minor errors in the rotation of the output shaft that vary depending on the rotation of the input shaft. These minor errors can be compensated for by appropriately adjusting the position of the subframes (or the radii of the input and output arms) during appropriate portions of each cycle. Thus, the optimal positioning of each subframe (or the optimal radius of each arm) varies during each cycle. For high precision, therefore, additional control mechanisms can be added in order to appropriately adjust the positioning of each subframe (or the radius of each arm). For example, appropriately configured cams can be attached to the input or output shafts and linked to the controls for positioning the subframes or altering the radii of the arms.

More stages can be added to each module, which can improve the range and/or accuracy of the system.

Figure 16A:
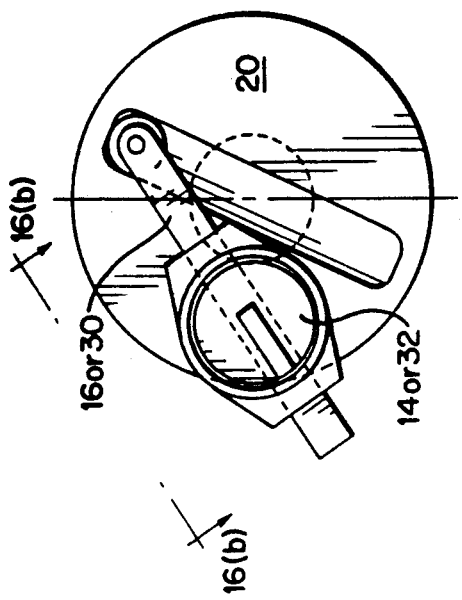
FIG. 16(a) is an elevational view of an embodiment in which the input and output arm radii are varied for control and the distances between the shafts remain fixed, with details of the mechanism for controlling the radii omitted for clarity.
Figure 16B:
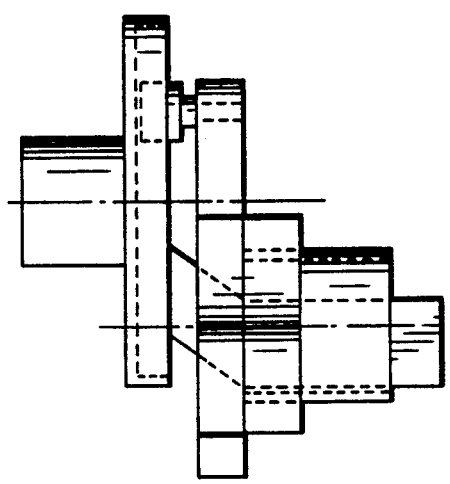
FIG. 16(b) is a top plan view of the embodiment of FIG. 16(a).
Figure 15A:
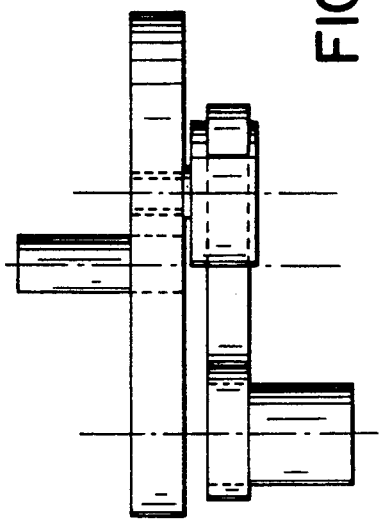
FIG. 15(a) is a top plan view of an embodiment in which the intermediate module has a fixed radius and the slot has been moved to the input or output stage arms.
Figure 15B:
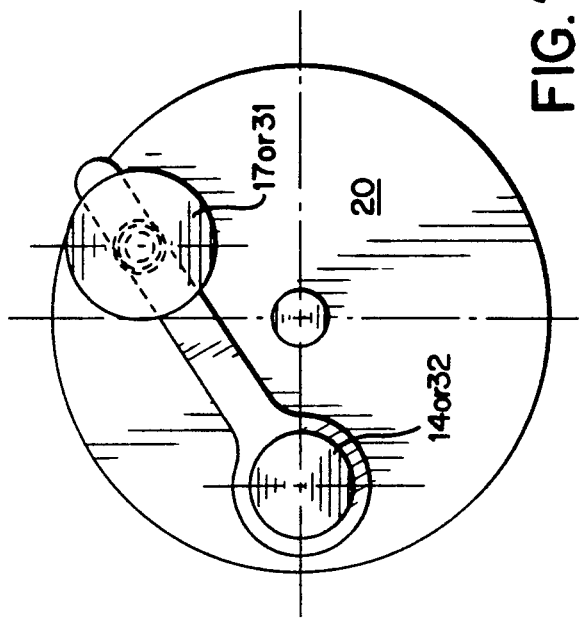
FIG. 15(b) is an elevational view of the embodiment of FIG. 15(a).

The radii AB and/or EG can be varied as well. Then any two of the distances OA and OG or the radii AB and EG can be used to control and effect speed variation. Any apparatus or method known in the art can be used to vary the radii and no specific apparatus or method is strongly preferred. Examples of such radii variation mechanisms are shown in FIGS. 16(a) and 16(b), in Grant and in prior art shaper tools.

The slot/roller location at the slider joints could be reversed, causing the intermediate radii GB and GE to become the fixed radii, while AG and GO become the slider links. Equations 10-40 require some modifications when this arrangement is used.

Of course, more parallel modules could be added to the system.

Use of differentials to extract the useful part of the cycle of each module in the less than unity ratio applications leads to yet another possible embodiment.

Differentials and/or timed gears could be used instead of the overrunning clutches.

Of course, passive and/or dynamic vibration control devices, constant velocity or other types of universal joints can be added to provide a smoother coupling between the input and output shafts.

What is claimed is:

1. A stepless variable transmission connecting a rotating input shaft to a rotatable output shaft, comprising:
   an input stage arm having a controllably movable input arm engagement member mounted for circular motion of said input arm engagement member around an input stage center of motion drivably connected to said input shaft, said input stage center of motion and said input arm engagement member defining a controllably variable input stage arm radius, whereby rotation of said input shaft drives said input arm engagement member into circular motion around said input stage center of motion;
   an intermediate stage linkage having an elongated slide mounted for rotation of said slide around an intermediate stage center of rotation, wherein said input arm engagement member is engaged in said slide, whereby circular motion of said input arm engagement member drives said slide into periodic rotational motion around said intermediate stage center of rotation;
   an output stage arm having a controllably movable output arm engagement member mounted for circular motion of said output arm engagement member around an output stage center of motion, said output stage center of motion and said output arm engagement member defining a controllably variable output stage arm radius, wherein said output arm engagement member is engaged in said slide, whereby periodic rotational motion of said slide drives said output arm engagement member into periodic circular motion around said output stage center of motion;
   an overrunning clutch mounted between said output arm engagement member and said output shaft, drivably connecting said output arm engagement member to said output shaft, whereby a portion of said periodic circular motion of said output arm engagement member drives said output shaft into rotational motion; and
   control means for simultaneously controllably varying said input stage arm radius and said output stage arm radius.

2. A stepless variable transmission connecting a rotating input shaft to a rotatable output shaft, comprising:
   a plurality of modules connecting said input shaft to said output shaft, each of said modules transmitting rotation of said input shaft to said output shaft only over a portion of a rotation of said output shaft;
   an input stage arm having a controllably movable input arm engagement member mounted for circular motion of said input arm engagement member around an input stage center of motion drivably connected to said input shaft, said input stage center of motion and said input arm engagement member defining a controllably variable input stage arm radius, whereby rotation of said input shaft drives said input arm engagement member into circular motion around said input stage center of motion;
   an intermediate stage linkage mounted for rotation around an intermediate stage center of rotation, wherein said input arm engagement member is engaged with said intermediate stage linkage, whereby circular motion of said input arm engagement member drives said intermediate stage linkage into periodic rotational motion around said intermediate stage center of rotation;
   an output stage arm having a controllably movable output arm engagement member mounted for circular motion of said output arm engagement member around an output stage center of motion, said output stage center of motion and said output arm engagement member defining a controllably variable output stage arm radius wherein said output stage arm is engaged in said intermediate stage linkage, whereby periodic rotational motion of said intermediate stage linkage drives said output arm engagement member into periodic circular motion around said output stage center of motion;
   an overrunning clutch mounted between said output arm engagement member and said output shaft, drivably connecting said output arm engagement member to said output shaft, whereby a portion of said periodic circular motion of said output arm engagement member drives said output shaft into rotational motion; and
   control means for simultaneously controllably varying said input stage arm radius and said output stage arm radius.

3. A process for steplessly variably transmitting rotation from a rotating input shaft to a rotatable output shaft, comprising:
   translating rotation of said input shaft into circular motion of an input stage arm having a controllably variable input arm radius around an input stage center of motion;
   converting said circular motion of said input stage arm into periodic rotational motion of an intermediate stage linkage mounted for rotation around an intermediate stage center of rotation;
   re-converting said periodic rotational motion of said intermediate stage linkage into periodic circular motion of an output stage arm having a controllably variable output stage arm radius around an output stage center of motion;
   extracting a useful portion of said periodic circular motion of said output stage arm;
   transmitting said extracted useful portion of said periodic circular motion into rotational motion of said output shaft; and
   simultaneously controllably varying said input stage arm radius and said output stage arm radius, whereby rotation of said input shaft is transmitted into stepless variable rotation of said output shaft.

4. A stepless variable transmission, comprising:
   translation means for translating rotation of said input shaft into circular motion of an input stage arm having a controllably variable input arm radius around an input stage center of motion;

conversion means for converting said circular motion of said input stage arm into periodic rotational motion of an intermediate stage linkage mounted for rotation around an intermediate stage center of rotation;

reconversion means for re-converting said periodic rotational motion of said intermediate stage linkage into periodic circular motion of an output stage arm having a controllably variable output stage arm radius around an output stage center of motion;

extraction means for extracting a useful portion of said periodic circular motion of said output stage arm;

transmitting means for transmitting said extracted useful portion of said periodic circular motion into rotational motion of said output shaft; and control means for simultaneously controllably varying said input stage arm radius and said output stage arm radius, whereby rotation of said input shaft is transmitted into stepless variable rotation of said output shaft.

5. A process for steplessly variably transmitting rotation from a rotating input shaft to a rotatable output shaft comprising:

translating rotation of said input shaft into circular motion of an input stage arm around an input stage center of motion;

converting said circular motion of said input stage arm into periodic rotational motion of an intermediate stage linkage mounted for rotation around an intermediate stage center of rotation, said input stage center of motion and said intermediate stage center of rotation defining an input-intermediate center distance;

re-converting said periodic rotational motion of said intermediate stage linkage into periodic circular motion of an output stage arm around an output stage center of motion, said intermediate stage center of rotation and said output stage center of motion defining an intermediate-output center distance;

extracting a useful portion of said circular motion of said output stage arm;

transmitting said extracted useful portion of said circular motion into rotational motion of said output shaft; and simultaneously controllably varying said input-intermediate center distance and said intermediate-output center distance, whereby rotation of said input shaft is transmitted into stepless variable rotation of said output shaft;

wherein:

said input stage arm and said input stage center of motion define an input arm radius;

said output stage arm and said output stage center of motion define an output arm radius;

said input-intermediate center distance and said intermediate-output center distance define an input-output center distance; and said input stage arm radius and said output stage arm radius are scaled so that stepless variable rotation of said output shaft can be effected by simultaneously changing said input-intermediate center distance and said intermediate-output center distance by equal and opposite amounts, whereby said input-output center distance remains constant.

6. A stepless variable transmission, comprising:

translating means for translating rotation of an input shaft into circular motion of an input stage arm around an input stage center of motion;

conversion means for converting said circular motion of said input stage arm into periodic rotational motion of an intermediate stage linkage mounted for rotation around an intermediate stage center of rotation displaced from said input stage center of motion by an input-intermediate center distance;

reconversion means for re-converting said periodic rotational motion of said intermediate stage linkage into periodic circular motion of an output stage arm around an output stage center of motion displaced from said intermediate stage center of rotation by an intermediate-output center distance;

extraction means for extracting a useful portion of said circular motion of said output stage arm;

transmitting means for transmitting said extracted useful portion of said circular motion into rotational motion of said output shaft; and control means for simultaneously controllably varying said input-intermediate center distance and said intermediate-output center distance, whereby rotation of said input shaft is transmitted into stepless variable rotation of said output shaft;

wherein:

said input stage arm and said input stage center of motion define an input arm radius;

said output stage arm and said output stage center of motion define an output arm radius;

said input-intermediate center distance and said intermediate-output center distance define an input-output center distance; and said input arm radius and said output arm radius are scaled so that stepless variable rotation of said output shaft can be effected by simultaneously changing said input-intermediate center distance and said intermediate-output center distance by equal and opposite amounts, whereby said input-output center distance remains constant.

7. A stepless variable transmission connecting a rotating input shaft to a rotatable output shaft, comprising:

an input stage arm having an input arm engagement member mounted for circular motion of said input arm engagement member around an input stage center of motion drivably connected to said input shaft, whereby rotation of said input shaft drives said input arm engagement member into circular motion around said input stage center of motion;

an intermediate stage linkage having an elongated slide mounted for rotation of said slide around an intermediate stage center of rotation, said input stage center of motion and said intermediate stage center of rotation defining an input-intermediate center distance, wherein said input arm engagement member is engaged in said slide, whereby circular motion of said input arm engagement member drives said slide into periodic rotational motion around said intermediate stage center of rotation;

an output stage arm having an output arm engagement member mounted for circular motion of said output arm engagement member around an output stage center of motion, said output stage center of motion and said intermediate stage center of rotation defining an intermediate-output center distance, wherein said output arm engagement member is engaged in said slide, whereby said periodic rotational motion of said slide drives said output arm engagement member into periodic circular motion around said output stage center of motion;

an overrunning clutch mounted between said output arm engagement member and said output shaft, drivably connecting said output arm engagement member to said output shaft, whereby a portion of said periodic circular motion of said output arm engagement member drives said output shaft into rotational motion; and control means for simultaneously controllably varying said input-intermediate center distance and said intermediate-output center distance;

wherein:

said input stage center of motion and said input arm engagement member define an input arm radius;

said output stage center of motion and said output arm engagement member define an output arm radius;

said rotational motion of said output shaft defines an output speed;

said rotational motion of said input shaft defines an input speed;

said input speed and said output speed define a transmission ratio;

said input-intermediate center distance and said intermediate-output center distance define an input-output center distance; and said input arm radius and said output arm radius are scaled so that said transmission ratio can be controllably varied by simultaneously changing said input-intermediate center distance and said intermediate-output center distance by equal and opposite amounts, whereby said input-output center distance remains constant.

8. A stepless variable transmission according to claim 7, wherein:

said control means comprises:

a screw operatively connected to said intermediate stage linkage to simultaneously controllably vary said input-intermediate center distance and said intermediate-output center distance by equal and opposite amounts.

9. A stepless variable transmission according to claim 7, wherein:

said control means comprises:

a cam operatively connected to said intermediate stage linkage to simultaneously controllably vary said input-intermediate center distance and said intermediate-output center distance by equal and opposite amounts.

10. A stepless variable transmission according to claim 7, wherein:

said control means comprises:

a hydraulic actuator operatively connected to said intermediate stage linkage to simultaneously controllably vary said input-intermediate center distance and said intermediate-output center distance by equal and opposite amounts.

11. A stepless variable transmission connecting a rotating input shaft to a rotatable output shaft, comprising:

a plurality of modules connecting said input shaft to said output shaft, each of said modules transmitting rotation of said input shaft to said output shaft only over a portion of a rotation of said output shaft;

wherein each of said modules comprises:

an input stage arm having an input arm engagement member mounted for circular motion of said input arm engagement member around an input stage center of motion drivably connected to said input shaft, whereby rotation of said input shaft drives said input arm engagement member into circular motion around said input stage center of motion;

an intermediate stage linkage mounted for rotation around an intermediate stage center of rotation, said input stage center of motion and said intermediate stage center of rotation defining an input-intermediate center distance, wherein said input arm engagement member is engaged with said intermediate stage linkage, whereby circular motion of said input arm engagement member drives said intermediate stage linkage into periodic rotational motion around said intermediate stage center of rotation;

an output stage arm having an output arm engagement member mounted for circular motion of said output arm engagement member around an output stage center of motion, said intermediate stage center of rotation and said output stage center of motion defining an intermediate-output center distance, wherein said output arm engagement member is engaged with said intermediate stage linkage, whereby said periodic rotational motion of said intermediate stage linkage drives said output arm engagement member into periodic circular motion around said output stage center of motion;

an overrunning clutch mounted between said output arm engagement member and said output shaft, drivably connecting said output arm engagement member to said output shaft, whereby a portion of said periodic circular motion of said output arm engagement member drives said output shaft into rotational motion; and control means for simultaneously controllably varying said input-intermediate center distance and said intermediate-output center distance;

wherein:

said input stage center of motion and said input arm engagement member define an input arm radius;

said output stage center of motion and said output arm engagement member define an output arm radius;

said rotational motion of said output shaft defines an output speed;

said rotational motion of said input shaft defines an input speed;

said input speed and said output speed define a transmission ratio;

said input-intermediate center distance and said intermediate-output center distance define an input-output center distance; and said input arm radius and said output arm radius are scaled so that said transmission ratio can be controllably varied by simultaneously changing said input-intermediate center distance and said intermediate-output center distance by equal and opposite amounts, whereby said input-output center distance remains constant.

12. A stepless variable transmission according to claim 11, wherein:

said control means comprises:

a screw operatively connected to said intermediate stage linkage to simultaneously controllably vary said input-intermediate center distance and said intermediate-output center distance by equal and opposite amounts.

13. A stepless variable transmission according to claim 11, wherein:
said control means comprises:
a cam operatively connected to said intermediate stage linkage to simultaneously controllably vary said input-intermediate center distance and said intermediate-output center distance by equal and opposite amounts.

14. A stepless variable transmission according to claim 11, wherein:
said control means comprises:
a hydraulic actuator operatively connected to said intermediate stage linkage to simultaneously controllably vary said input-intermediate center distance and said intermediate-output center distance by equal and opposite amounts.

15. A stepless variable transmission connecting a rotating input shaft to a rotatable output shaft, comprising:
a plurality of modules connecting said input shaft to said output shaft, each of said modules transmitting rotation of said input shaft to said output shaft only over a portion of a rotation of said output shaft;
wherein each of said modules comprises:
an input stage arm having an input arm engagement member mounted for circular motion of said input arm engagement member around an input stage center of motion drivably connected to said input shaft, whereby rotation of said input shaft drives said input arm engagement member into circular motion around said input stage center of motion;
an intermediate stage linkage mounted for rotation around an intermediate stage center of rotation, said input stage center of motion and said intermediate stage center of rotation defining an input-intermediate center distance, wherein said input arm engagement member is engaged with said intermediate stage linkage, whereby circular motion of said input arm engagement member drives said intermediate stage linkage into periodic rotational motion around said intermediate stage center of rotation;
an output stage arm having an output arm engagement member mounted for circular motion of said output arm engagement member around an output stage center of motion, said intermediate stage center of rotation and said output stage center of motion defining an intermediate-output center distance, wherein said output arm engagement member is engaged with said intermediate stage linkage, whereby said periodic rotational motion of said intermediate stage linkage drives said output arm engagement member into periodic circular motion around said output stage center of motion;
an overrunning clutch mounted between said output arm engagement member and said output shaft, drivably connecting said output arm engagement member to said output shaft, whereby a portion of said periodic circular motion of said output arm engagement member drives said output shaft into rotational motion; and control means for simultaneously controllably varying said input-intermediate center distance and said intermediate-output center distance;
wherein said control means comprises:
a first cam operatively connected to said intermediate stage linkage to controllably vary said input-intermediate center distance; and
a second cam operatively connected to said output stage arm to controllably said intermediate-output center distance.

16. A stepless variable transmission connecting a rotating input shaft to a rotatable output shaft, comprising:
an input stage arm having an input arm engagement member mounted for circular motion of said input arm engagement member around an input stage center of motion drivably connected to said input shaft, whereby rotation of said input shaft drives said input arm engagement member into circular motion around said input stage center of motion;
an intermediate stage linkage having an elongated slide mounted for rotation of said slide around an intermediate stage center of rotation, said input stage center of motion and said intermediate stage center of rotation defining an input-intermediate center distance, wherein said input arm engagement member is engaged in said slide, whereby circular motion of said input arm engagement member drives said slide into periodic rotational motion around said intermediate stage center of rotation;
an output stage arm having an output arm engagement member mounted for circular motion of said output arm engagement member around an output stage center of motion, said output stage center of motion and said intermediate stage center of rotation defining an intermediate-output center distance, wherein said output arm engagement member is engaged in said slide, whereby said periodic rotational motion of said slide drives said output arm engagement member into periodic circular motion around said output stage center of motion;
an overrunning clutch mounted between said output arm engagement member and said output shaft, drivably connecting said output arm engagement member to said output shaft, whereby a portion of said periodic circular motion of said output arm engagement member drives said output shaft into rotational motion; and
control means for simultaneously controllably varying said input-intermediate center distance and said intermediate-output center distance;
wherein:
said control means comprises:
a first cam operatively connected to said intermediate stage linkage to controllably vary said input-intermediate center distance; and
a second cam operatively connected to said output stage arm to controllably vary said intermediate-output center distance.

17. A stepless variable transmission connecting a rotating input shaft to a rotatable output shaft, comprising:
an input stage arm having an input arm engagement member mounted for circular motion of said input arm engagement member around an input stage center of motion drivably connected to said input shaft, whereby rotation of said input shaft drives said input arm engagement member into circular motion around said input stage center of motion;

an intermediate stage linkage having an elongated slide mounted for rotation of said slide around an intermediate stage center of rotation, said input stage center of motion and said intermediate stage center of rotation defining an input-intermediate center distance, wherein said input arm engagement member is engaged in said slide, whereby circular motion of said input arm engagement member drives said slide into periodic rotational motion around said intermediate stage center of rotation;

an output stage arm having an output arm engagement member mounted for circular motion of said output arm engagement member around an output stage center of motion, said output stage center of motion and said intermediate stage center of rotation defining an intermediate-output center distance, wherein said output arm engagement member is engaged in said slide, whereby said periodic rotational motion of said slide drives said output arm engagement member into periodic circular motion around said output stage center of motion;

an overrunning clutch mounted between said output arm engagement member and said output shaft, drivably connecting said output arm engagement member to said output shaft, whereby a portion of said periodic circular motion of said output arm engagement member drives said output shaft into rotational motion; and control means for simultaneously controllably varying said input-intermediate center distance and said intermediate-output center distance, wherein:

said control means comprises:

a first hydraulic actuator operatively connected to said intermediate stage linkage to controllably vary said input-intermediate center distance; and a second hydraulic actuator operatively connected to said intermediate stage linkage and said output stage arm to controllably vary said intermediate-output center distance.

18. A stepless variable transmission connecting a rotating input shaft to a rotatable output shaft, comprising:

a plurality of modules connecting said input shaft to said output shaft, each of said modules transmitting rotation of said input shaft to said output shaft only over a portion of a rotation of said output shaft;

wherein each of said modules comprises:

an input stage arm having an input arm engagement member mounted for circular motion of said input arm engagement member around an input stage center of motion drivably connected to said input shaft, whereby rotation of said input shaft drives said input arm engagement member into circular motion around said input stage center of motion;

an intermediate stage linkage mounted for rotation around an intermediate stage center of rotation, said input stage center of motion and said intermediate stage center of rotation defining an input-intermediate center distance, wherein said input arm engagement member is engaged with said intermediate stage linkage, whereby circular motion of said input arm engagement member drives said intermediate stage linkage into periodic rotational motion around said intermediate stage center of rotation;

an output stage arm having an output arm engagement member mounted for circular motion of said output arm engagement member around an output stage center of motion, said intermediate stage center of rotation and said output stage center of motion defining an intermediate-output center distance, wherein said output arm engagement member is engaged with said intermediate stage linkage, whereby said periodic rotational motion of said intermediate stage linkage drives said output arm engagement member into periodic circular motion around said output stage center of motion;

an overrunning clutch mounted between said output arm engagement member and said output shaft, drivably connecting said output arm engagement member to said output shaft, whereby a portion of said periodic circular motion of said output arm engagement member drives said output shaft into rotational motion; and control means for simultaneously controllably varying said input-intermediate center distance and said intermediate-output center distance;

wherein said control means comprises:

a first hydraulic actuator operatively connected to said intermediate stage linkage to controllably vary said input-intermediate center distance; and a second hydraulic actuator operatively connected to said intermediate stage linkage and output stage arm to controllably vary said intermediate-output center distance.

19. A stepless variable transmission connecting a rotating input shaft to a rotatable output shaft, comprising:

a plurality of modules connecting said input shaft to said output shaft, each of said modules transmitting rotation of said input shaft to said output shaft only over a portion of a rotation of said output shaft;

wherein each of said modules comprises:

an input stage arm having an input arm engagement member mounted for circular motion of said input arm engagement member around an input stage center of motion drivably connected to said input shaft, whereby rotation of said input shaft drives said input arm engagement member into circular motion around said input stage center of motion;

an intermediate stage linkage mounted for rotation around an intermediate stage center of rotation, said input stage center of motion and said intermediate stage center of rotation defining an input-intermediate center distance, wherein said input arm engagement member is engaged with said intermediate stage linkage, whereby circular motion of said input arm engagement member drives said intermediate stage linkage into periodic rotational motion around said intermediate stage center of rotation;

an output stage arm having an output arm engagement member mounted for circular motion of said output arm engagement member around an output stage center of motion, said intermediate stage center of rotation and said output stage center of motion defining an intermediate-output center distance, wherein said output arm engagement member is engaged with said intermediate stage linkage, whereby said periodic rotational motion of said intermediate stage linkage drives said output arm engagement member into periodic circular motion around said output stage center of motion;

an overrunning clutch mounted between said output arm engagement member and said output shaft, drivably connecting said output arm engagement member to said output shaft, whereby a portion of said periodic circular motion of said output arm engagement member drives said output shaft into rotational motion; and control means for simultaneously controllably varying said input-intermediate center distance and said intermediate-output center distance;

wherein:

said control means comprises:

an elongated linkage having a first end, pivoted for rotation at said first end, operatively connected along a first portion of its length to said intermediate stage linkage to controllably vary said input-intermediate center distance and operatively connected along a second portion of its length to said output stage arm to controllably vary said intermediate-output center distance.

20. A stepless variable transmission connecting a rotating input shaft to a rotatable shaft, comprising:

an input stage arm having an input arm engagement member mounted for circular motion of said input arm engagement member around an input stage center of motion drivably connected to said input shaft, whereby rotation of said input shaft drives said input arm engagement member into circular motion around said input stage center of motion;

an intermediate stage linkage having an elongated slide mounted for rotation of said slide around an intermediate stage center of rotation, said input stage center of motion and said intermediate stage center of rotation defining an input-intermediate center distance, wherein said input arm engagement member is engaged in said slide, whereby circular motion of said input arm engagement member drives said slide into periodic rotational motion around said intermediate stage center of rotation;

an output stage arm having an output arm engagement member mounted for circular motion of said output arm engagement member around an output stage center of motion, said output stage center of motion and said intermediate stage center of rotation defining an intermediate-output center distance, wherein said output arm engagement member is engaged in said slide, whereby said periodic rotational motion of said slide drives said output arm engagement member into periodic circular motion around said output stage center of motion;

an overrunning clutch mounted between said output arm engagement member and said output shaft, drivably connecting said output arm engagement member to said output shaft, whereby a portion of said periodic circular motion of said output arm engagement member drives said output shaft into rotational motion; and control means for simultaneously controllably varying said input-intermediate center distance and said intermediate-output center distance;

wherein:

said control means comprises:

an elongated linkage having a first end, pivoted for rotation at said first end, operatively connected along a first portion of its length to said intermediate stage linkage to controllably vary said input-intermediate center distance and operatively connected along a second portion of its length to said output stage arm to controllably vary said intermediate-output center distance.

21. A stepless variable transmission connecting a rotating input shaft to a rotatable output shaft, comprising:

a plurality of modules connecting said input shaft to said output shaft, each of said modules transmitting rotation of said input shaft to said output shaft only over a portion of a rotation of said output shaft;

wherein each of said modules comprises:

an input stage arm having an input arm engagement member adjacent to a first end mounted adjacent to a second end for circular motion of said input arm engagement member around an input stage center of motion drivably connected to said input shaft, whereby rotation of said input shaft drives said input arm engagement member into circular motion around said input stage center of motion;

an intermediate stage linkage having an elongated slide mounted for rotation of said slide around an intermediate stage center of rotation, said input stage center of motion and said intermediate stage center of rotation defining an input-intermediate center distance, wherein said input arm engagement member is engaged in said slide whereby circular motion of said input arm engagement member drives said slide into periodic rotational motion around said intermediate stage center of rotation;

an output stage arm having an output arm engagement member adjacent to a first end mounted adjacent to a second end for circular motion of said output arm engagement member around an output stage center of motion, said intermediate center of rotation and said output stage center of motion defining an intermediate-output center distance, wherein said output arm engagement member is engaged in said slide, whereby said periodic rotational motion of said slide drives said output arm engagement member into periodic circular motion around said output stage center of motion;

a differential mounted between said output arm engagement member and said output shaft, drivably connecting said output arm engagement member to said output shaft, whereby a portion of said periodic circular motion of said output arm engagement member drives said output shaft into rotational motion; and a screw having first and second portions having first and second pitches respectively, said first portion being operatively connected to said intermediate stage linkage to controllably vary said input-intermediate center distance; and said second portion being operatively connected to said output stage arm to controllably vary said intermediate-output center distance.

* * * * *